(12) United States Patent
Feng et al.

(10) Patent No.: US 12,067,450 B2
(45) Date of Patent: Aug. 20, 2024

(54) NEAR CO-AXIAL POLARIZED ILLUMINATOR APPARATUSES AND USES THEREOF

(71) Applicant: Hand Held Products, Inc., Charlotte, NC (US)

(72) Inventors: Chen Feng, Snohomish, WA (US); Patrick Anthony Giordano, Glassboro, NJ (US); Tao Xian, Mount Laurel, NJ (US); Eric Alfons Youngblood, Matthews, NC (US); Paul R. Poloniewicz, Waxhaw, NC (US)

(73) Assignee: Hand Held Products, Inc., Charlotte, NC (US)

( * ) Notice: Subject to any disclaimer, the term of this patent is extended or adjusted under 35 U.S.C. 154(b) by 143 days.

(21) Appl. No.: 17/898,202

(22) Filed: Aug. 29, 2022

(65) Prior Publication Data

US 2024/0070414 A1 Feb. 29, 2024

(51) Int. Cl.
*G06K 7/10* (2006.01)

(52) U.S. Cl.
CPC ..... *G06K 7/10742* (2013.01); *G06K 7/10732* (2013.01); *G06K 7/10831* (2013.01)

(58) Field of Classification Search
None
See application file for complete search history.

(56) References Cited

U.S. PATENT DOCUMENTS

| 10,628,646 B1 | 4/2020 | Lozano et al. |
| 2017/0289421 A1 | 10/2017 | Tan et al. |
| 2020/0104556 A1* | 4/2020 | Gillet .................. G02B 27/106 |
| 2020/0202089 A1* | 6/2020 | Suman ............... G06K 7/10831 |
| 2020/0364419 A1* | 11/2020 | Barkan .............. G06K 7/10831 |
| 2022/0207253 A1 | 6/2022 | Perugini et al. |
| 2022/0224823 A1 | 7/2022 | Poloniewicz et al. |

FOREIGN PATENT DOCUMENTS

EP 4036787 A1 8/2022

OTHER PUBLICATIONS

Extended European Search Report Mailed on Jan. 22, 2024 for EP Application No. 23187754, 8 page(s).

\* cited by examiner

*Primary Examiner* — Kristy A Haupt
(74) *Attorney, Agent, or Firm* — Alston & Bird LLP

(57) ABSTRACT

Embodiments of the present disclosure include near co-axial polarized illuminator apparatuses and uses thereof. The near co-axial polarized illuminator is internally positionable in near co-axial alignment with one or more imager(s) utilized to capture a representation of a field of view illuminated by the near co-axial polarized illuminator. Embodiments include small form factor reader(s) that utilize a near co-axial polarized illuminator to improve illumination of a field of view captured via multiple imagers for detecting and/or decoding machine-readable symbologies, such as barcodes. Some embodiments include a DPM channel image sensor, a standard range channel image sensor, a near co-axial polarizer light source positioned adjacent to the DPM channel image sensor and adjacent to the standard range channel image sensor, a near co-axial polarizer aligned with the near co-axial polarizer light source, and an analyzer aligned with the DPM channel image sensor and/or the standard range channel image sensor.

20 Claims, 8 Drawing Sheets

NEAR CO-AXIAL POLARIZED ILLUMINATOR APPARATUSES AND USES THEREOF

TECHNOLOGICAL FIELD

Embodiments of the present disclosure generally relate to machine-readable symbology readers, and specifically to improved machine-readable symbology readers including near co-axial polarized illuminator(s) and uses thereof.

BACKGROUND

Machine-readable symbology readers often capture image representation(s) of an environment for processing. For example, a reader can capture an image of an environment and process the image for detecting and/or decoding a machine-readable symbology represented therein. Some readers utilize various illuminators in an attempt to illuminate a target object sufficiently to enable accurate image processing. Such illuminators, however, in various cases can negatively impact the image captured by the reader and/or require that the reader be designed with a large size to accommodate the illuminators.

Applicant has discovered problems with current implementations of machine-readable symbology reader(s). Through applied effort, ingenuity, and innovation, Applicant has solved many of these identified problems by developing embodied in the present disclosure, which are described in detail below.

BRIEF SUMMARY

In general, embodiments of the present disclosure are provided for improved readers, other improved near co-axial polarized illuminator apparatuses, and uses thereof. Other implementations for improved near co-axial polarized illuminator apparatuses and uses thereof will be, or will become, apparent to one with skill in the art upon examination of the following figures and detailed description. It is intended that all such additional implementations be included within this description be within the scope of the disclosure, and be protected by the following claims.

In accordance with a first aspect of the disclosure, an apparatus for near co-axial polarized illumination projection is provided. In some example embodiments, the example apparatus includes a DPM channel image sensor. The example apparatus further includes a standard range channel image sensor. The example apparatus further includes a near co-axial polarizer light source positioned adjacent to the DPM channel image sensor and adjacent to the standard range channel image sensor. The example apparatus a near co-axial polarizer aligned with the near co-axial polarizer light source. The example apparatus further includes an analyzer aligned with the DPM channel image sensor and/or the standard range channel image sensor.

Additionally or alternatively, in some embodiments of the example apparatus, the example apparatus further includes a near co-axial polarizer lens aligned with the near co-axial polarizer light source.

Additionally or alternatively, in some embodiments of the example apparatus, the example apparatus further includes a protective window aligned in front of the DPM channel image sensor, the standard range channel image sensor, and the near co-axial polarizer light source.

Additionally or alternatively, in some embodiments of the example apparatus, the example apparatus further includes a protective window, wherein the polarizer and the analyzer are secured to the protective window.

Additionally or alternatively, in some embodiments of the example apparatus, the analyzer is aligned with the DPM channel image sensor.

Additionally or alternatively, in some embodiments of the example apparatus, the example apparatus further includes an illumination board comprising a jut out, a first hole, and a second hole, where the jut out is adjacent to a center point between the first hole that receives the DPM channel image sensor and the second hole that receives the standard range channel image sensor, where the near co-axial polarizer light source is electronically coupled on the jut out.

Additionally or alternatively, in some embodiments of the example apparatus, the example apparatus further includes at least one additional illuminator.

Additionally or alternatively, in some embodiments of the example apparatus, the example apparatus further includes a ring illuminator.

Additionally or alternatively, in some embodiments of the example apparatus, the example apparatus further includes a diffusion illuminator.

Additionally or alternatively, in some embodiments of the example apparatus, the example apparatus further includes a near co-axial aimer light source positioned adjacent to the DPM channel image sensor and adjacent to the standard range channel image sensor, where the near co-axial aimer light source is positioned across a center point between the DPM channel image sensor and the standard range channel image sensor.

Additionally or alternatively, in some embodiments of the example apparatus, the example apparatus further includes a chassis that houses the DPM channel image sensor, the standard range channel image sensor, the near co-axial polarizer light source, the near co-axial polarizer, and the analyzer.

Additionally or alternatively, in some embodiments of the example apparatus, the example apparatus further includes a processor that controls activation of the DPM channel image sensor, the standard range channel image sensor, and/or the near co-axial polarizer light source.

Additionally or alternatively, in some embodiments of the example apparatus, the example apparatus further includes a processor communicatively coupled with the DPM channel image sensor and/or the standard range channel image sensor, where the processor receives a captured image from the standard range channel image sensor and/or the standard range channel image sensor, and wherein the processor processes the captured image via at least one image processing algorithm.

Additionally or alternatively, in some embodiments of the example apparatus, the DPM channel image sensor and the standard range channel image sensor are vertically aligned, and where the near co-axial polarizer light source is positioned to a side adjacent to a center point between the DPM channel image sensor and the standard range channel image sensor.

Additionally or alternatively, in some embodiments of the example apparatus, the example apparatus further includes a first board and a second board, where the DPM channel image source and the standard range channel image source are electronically coupled to the first board, and where the near co-axial polarizer light source is electronically coupled to the second board. In some such embodiments, the example apparatus further includes a third board and at least one ring illuminator light source, the at least one right illuminator light source electronically coupled to the third board.

Additionally or alternatively, in some embodiments of the example apparatus, the example apparatus further includes a DPM channel lens aligned with the DPM channel image sensor, and a standard range channel lens aligned with the standard range channel image sensor.

Additionally or alternatively, in some embodiments of the example apparatus, the example apparatus further includes an aimer light source, and a plurality of aimer folding optics, wherein the plurality of aimer folding optics are aligned to receive an aimer light generated by the aimer light source and redirect the aimer light in near co-axial alignment with the DPM channel image sensor and the standard range channel image sensor.

Additionally or alternatively, in some embodiments of the example apparatus, the example apparatus further includes a ring illuminator assembly comprising a ring lens, a ring illuminator board, and at least one ring illuminator light source electronically coupled to the ring illuminator board, wherein the ring lens is aligned in front of the at least one ring illuminator light source, a diffusion illuminator assembly comprising a diffusion illuminator and a diffusion back light reflector, a protector assembly comprising a protector window, the near co-axial polarizer, and the analyzer, at least one back light illumination board, wherein the near co-axial polarizer light is electronically coupled to the at least one back light illumination board, a near co-axial polarizer lens aligned with the near co-axial polarizer light source, a lens assembly comprising an aimer lens, a DPM channel imager lens, and a standard range channel imager lens, an aimer illuminator aligned with the aimer lens, at least one aimer folding optics, and at least one imager board comprising the DPM channel image sensor and the standard range channel image sensor.

In accordance with another aspect of the disclosure, a computer-implemented method for near co-axial polarized illumination projection and use is provided. The computer-implemented method is executable by any of a myriad of computing device(s) embodied in hardware, software, firmware, and/or a combination thereof. In one example embodiment of the computer-implemented method, the example computer-implemented method includes activating, via a reader, a polarized illuminator, the polarized illuminator positioned adjacent to at least each of a DPM channel imager and a standard range channel imager. The example computer-implemented method further includes exposing, via the reader, the DPM channel imager adjacent to the polarized illuminator to light projected through an analyzer aligned with the DPM channel imager. The example computer-implemented method further includes outputting, via the reader, a captured image from the DPM channel imager based at least in part on the exposure of the DPM channel imager.

In accordance with another aspect of the disclosure, a computer program product for near co-axial polarized illumination projection and use is provided. In one example embodiment of the computer program product, the computer program product includes at least one non-transitory computer-readable storage medium having computer program code stored thereon that, in execution with at least one processor, configures the at least one processor for performing any one of the example computer-implemented methods described herein.

In accordance with another aspect of the disclosure, another apparatus for near co-axial polarized illumination projection and use is provided. In one example embodiment of the apparatus, the apparatus includes at least one processor and at least one memory having computer-coded instructions stored thereon that, in execution with the at least one processor, causes the apparatus to perform any one of the example computer-implemented methods described herein. In another example embodiment of the apparatus, the apparatus includes means for performing each step of any one of the example computer-implemented methods described herein.

BRIEF DESCRIPTION OF THE DRAWINGS

Figure 1:
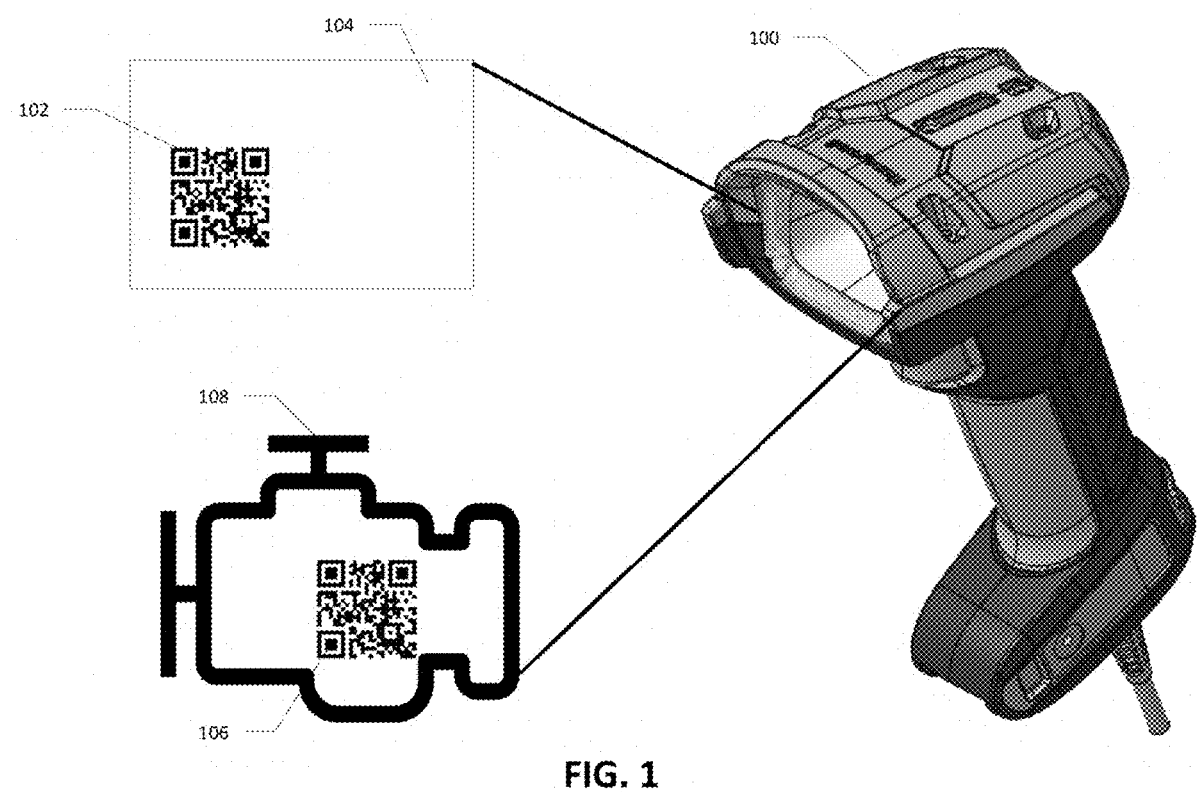
Figure 2:
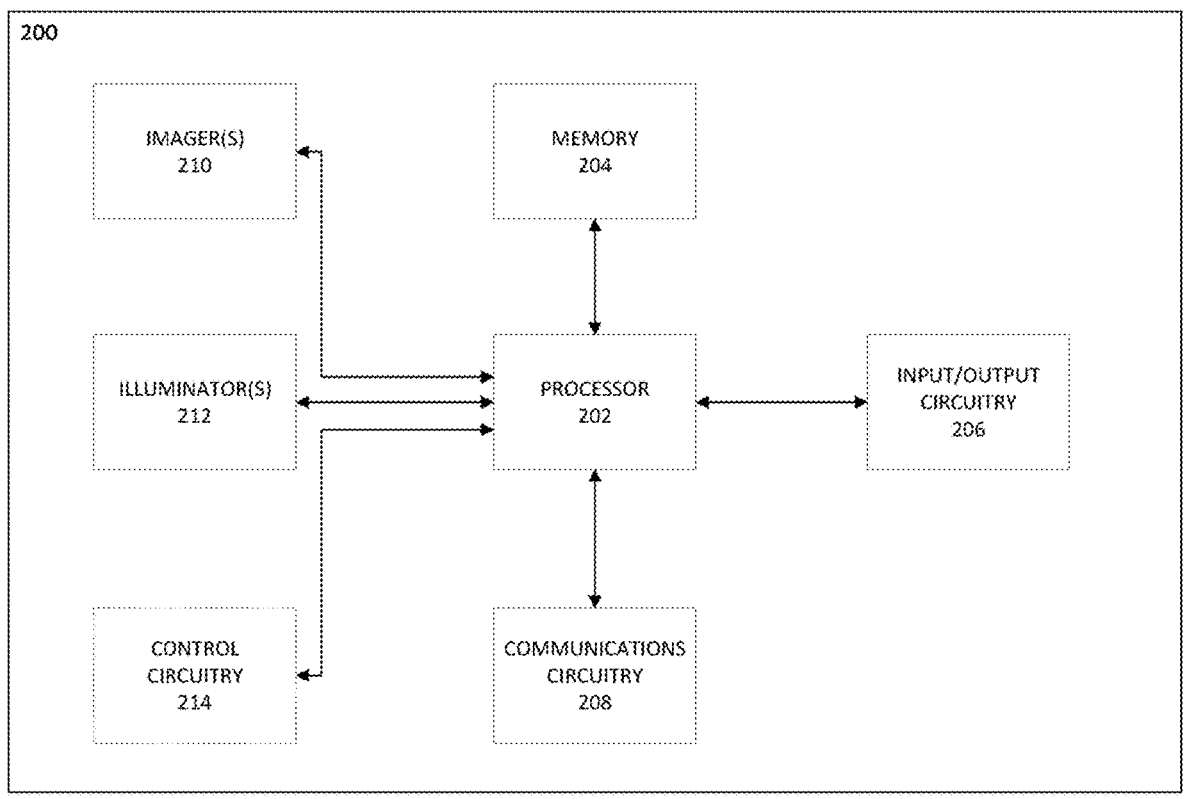
Figure 3:
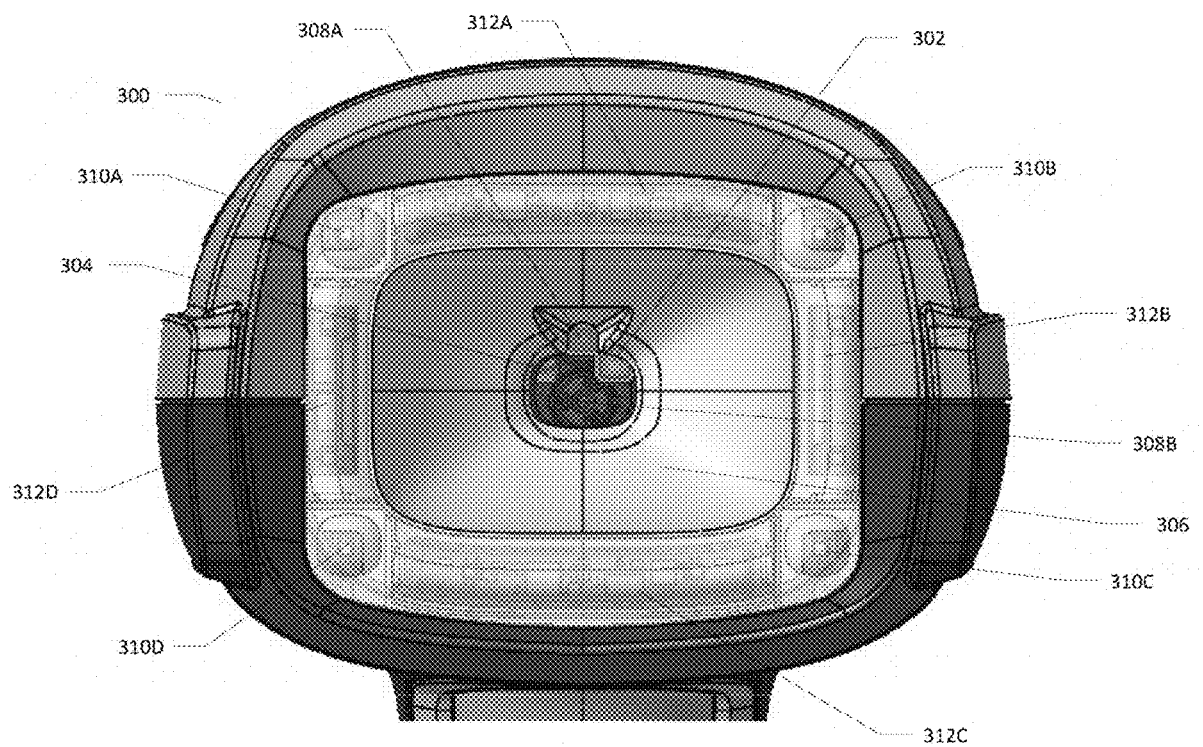
Figure 4A:
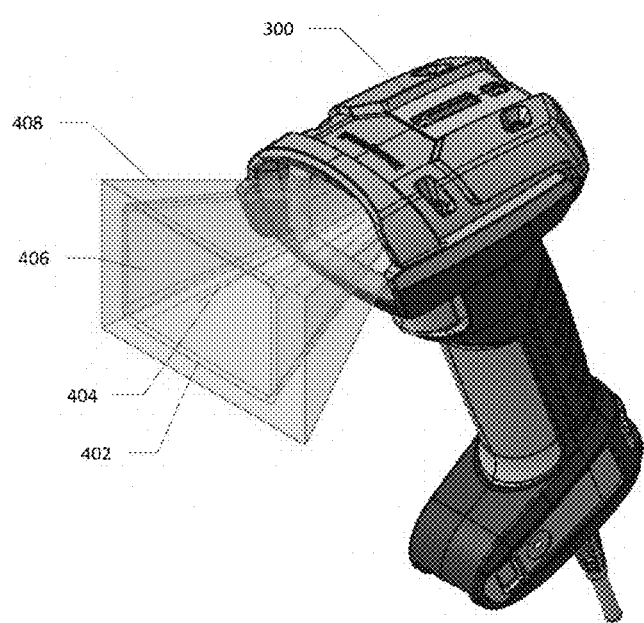
Figure 4B:
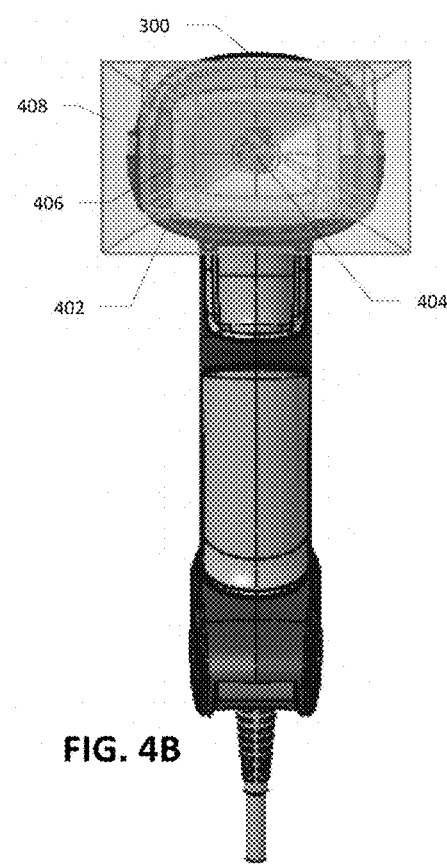
Figure 5:
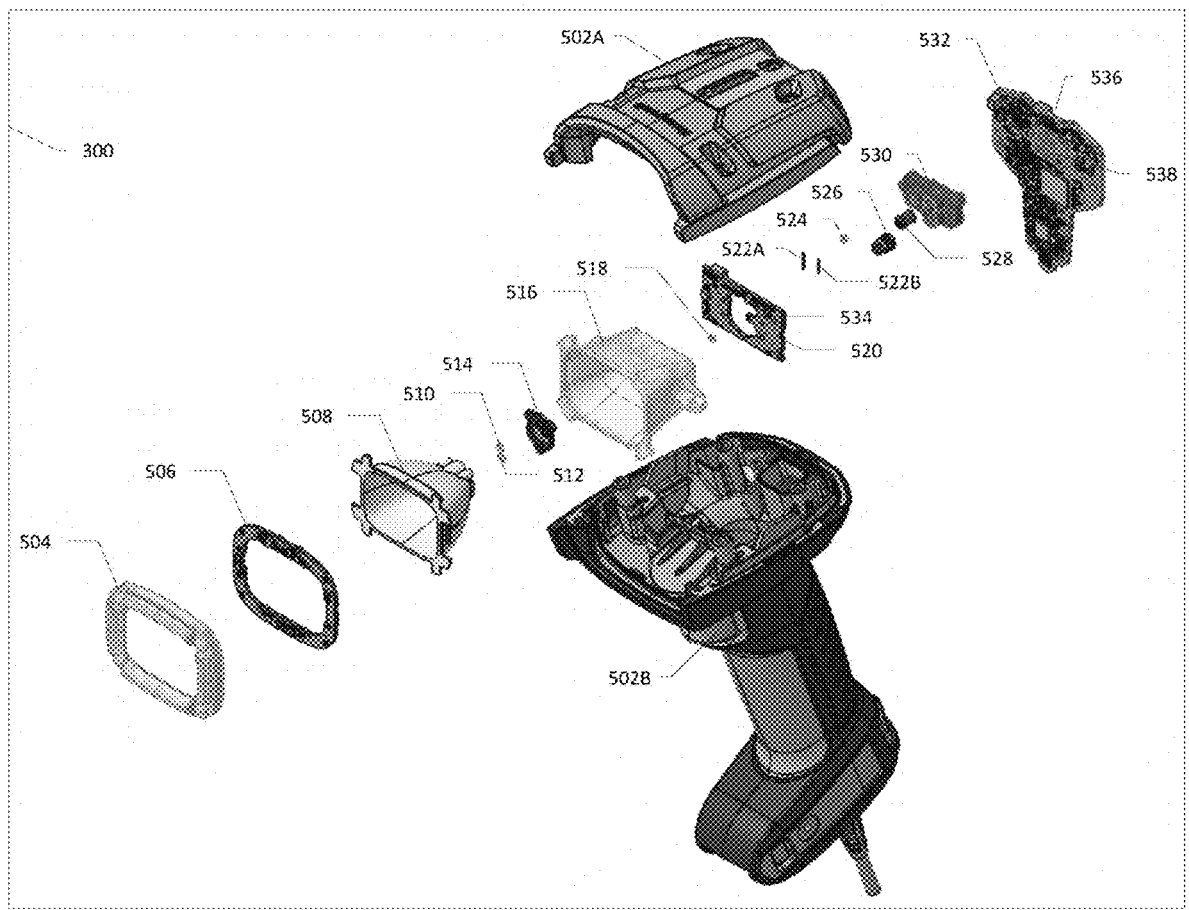
Figure 6:
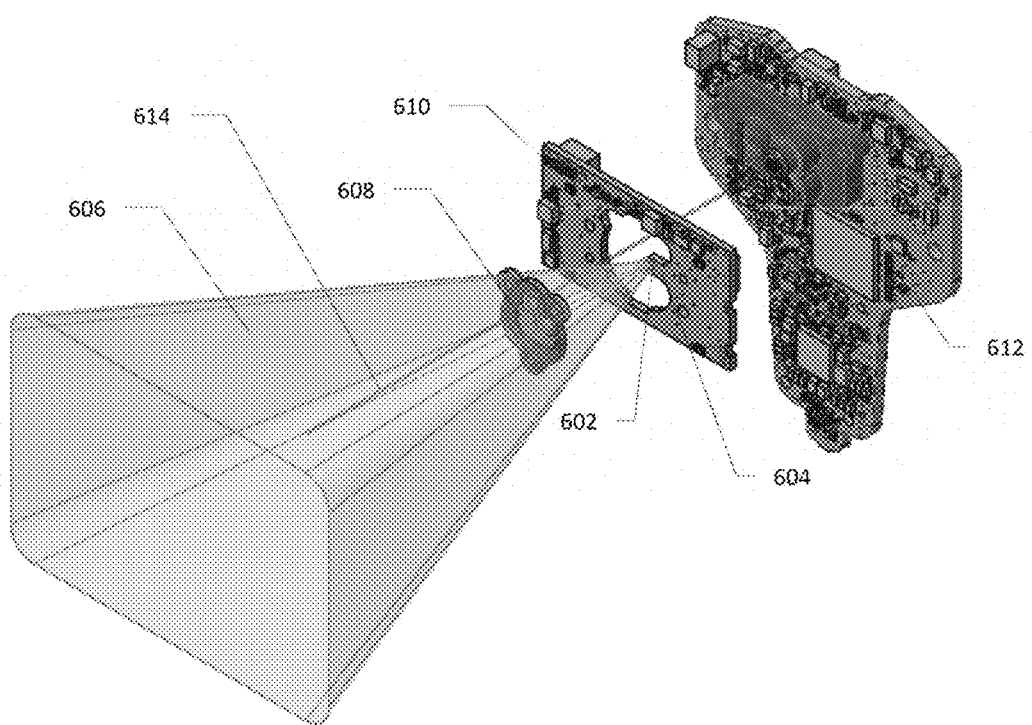
Figure 7:
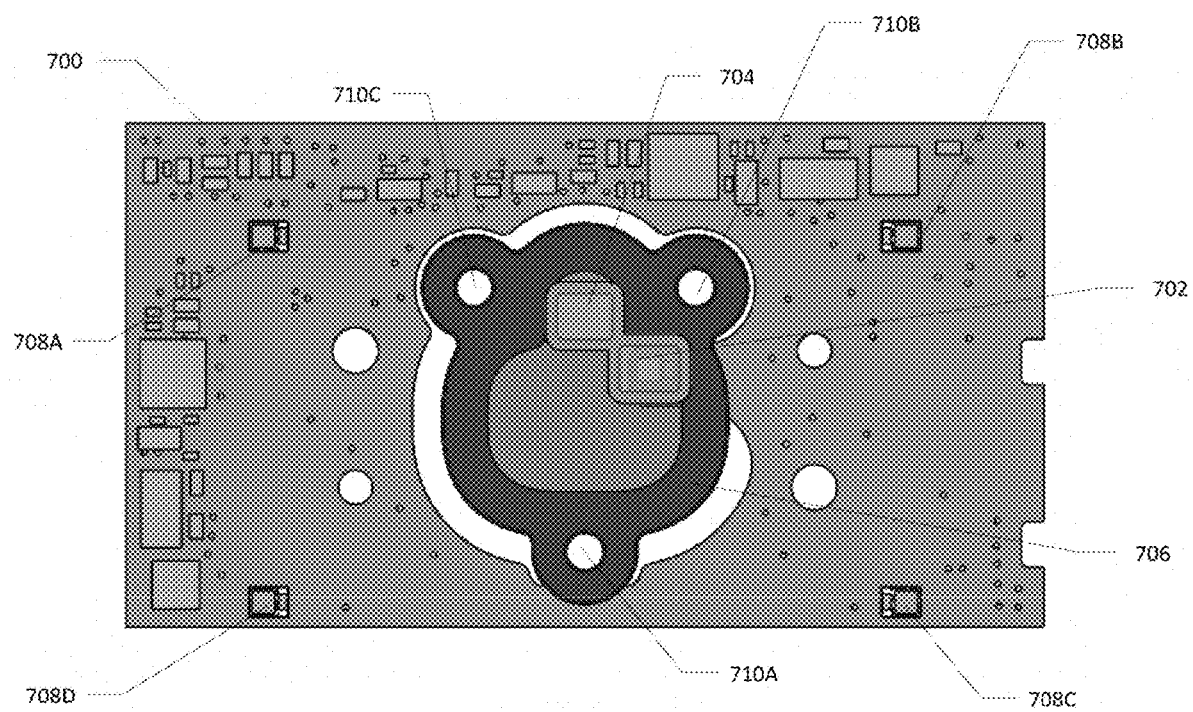
Figure 8:
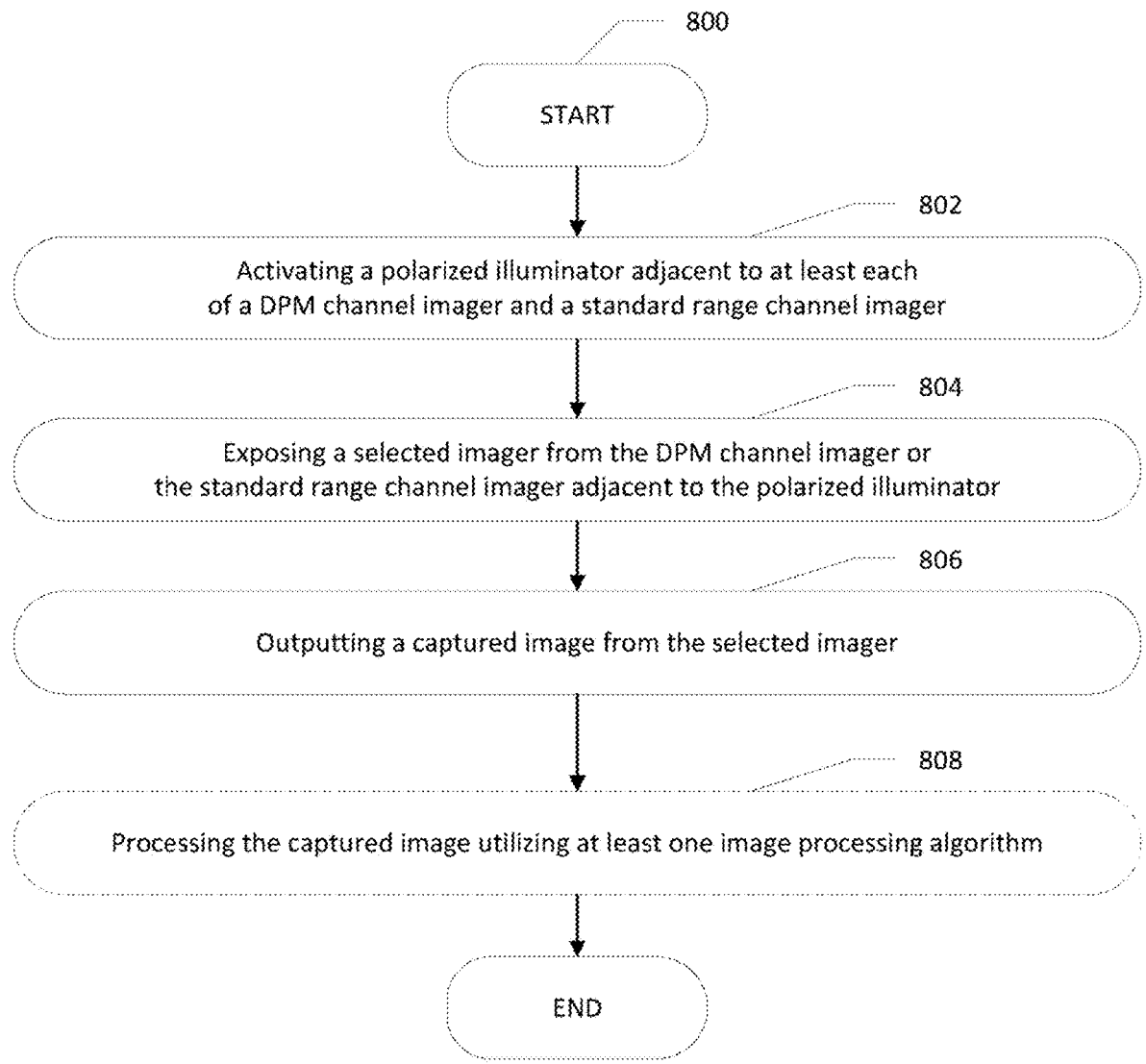

Having thus described the embodiments of the disclosure in general terms, reference now will be made to the accompanying drawings, which are not necessarily drawn to scale, and wherein:

FIG. 1 illustrates a block diagram of an example context for uses of improved near co-axial polarized illuminator apparatuses in accordance with at least an example embodiment of the present disclosure;

FIG. 2 illustrates a block diagram of an example apparatus that may be specially configured in accordance with at least an example embodiment of the present disclosure;

FIG. 3 illustrates a front view of an example near co-axial polarized illuminator apparatus embodying an improved reader in accordance with at least an example embodiment of the present disclosure;

FIG. 4A illustrates a perspective view of fields of view and illumination of said fields of view for a near co-axial polarized illuminator apparatus in accordance with at least an example embodiment of the present disclosure;

FIG. 4B illustrates a forward view of fields of view and illumination of said fields of view for a near co-axial polarized illuminator apparatus in accordance with at least an example embodiment of the present disclosure;

FIG. 5 illustrates an exploded view of an example near co-axial polarized illuminator apparatus embodying an improved reader in accordance with at least an example embodiment of the present disclosure;

FIG. 6 illustrates an exploded view of subassemblies of a near co-axial polarized illuminator apparatus and projected polarized illumination in accordance with at least an example embodiment of the present disclosure;

FIG. 7 illustrates an illuminator board subassembly in accordance with at least an example embodiment of the present disclosure; and FIG. 8 illustrates an example process for use of an improved near co-axial polarized illuminator apparatus in accordance with at least an example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Readers are useful to perform any of a myriad of image processing tasks. For example, a barcode reader may be utilized to capture images of an environment and attempt to detect and decode a barcode captured in such images. In this regard, a handheld, movable, or statically placed barcode reader may be activated to begin capture of images and processing of such images to detect and decode barcodes. As an image representation is captured, it may be processed to determine whether a barcode (or another machine-readable symbology) is detected as represented in the image, and to decode any the barcode (or other machine-readable symbology).

In some contexts, a reader includes multiple imagers. Each of the imagers may be configured differently in one or more ways. For example, in some embodiments, the reader includes two or more imagers that are associated with different fields of view capturable utilizing such imagers. In one such example context, a reader may include at least a DPM channel imager and at least a standard range channel imager, where the DPM channel imager is narrower than the standard range channel imager in one or more directions and/or is focused at a closer range such that up-close objects within the field remain clear, and where the standard range channel imager is boarder than the DPM channel imager in one or more directions and/or focused at a far range such that far-away objects within the field remain clear.

To improve the likelihood that the image is successfully processable, the reader may project one or more illumination(s) onto the field to be imaged. In different contexts, the field may be illuminated differently based on characteristics of the field and/or illuminator utilized to project the illumination. For example, multiple edge illuminators in a ring formation may be utilized to indirectly illuminate a central area of a field. Alternatively or additionally, a diffuse illuminator may be activated to project an illumination uniformly throughout the field. Such different illuminations may thus enable the same reader to be for successful reading of machine-readable symbologies produced in different manners.

One such example illuminator that a reader may utilize includes a polarized illuminator. A polarized illuminator projects a polarized illumination that is polarized in a particular direction. The reader may utilize a corresponding analyzer that filters light in an opposite orientation to the polarization. The polarized illumination may be utilized to reduce the effects of specular reflection from the object upon which the machine-readable symbology is printed or otherwise formed. In the context of direct part marking, the polarized illumination may be utilized to minimize the effects of specular reflection from the material of the object upon which the machine-readable symbology is etched, printed, and/or the like.

Polarized illumination is desirably projected uniformly across the machine-readable symbology. Due to component sizes and configurations, however, a polarized illuminator is often positioned near an edge of the reader. Such positioning of the polarized illuminator allows sufficient space for the components of the polarized illuminator to fit within the reader. However, the edge positioning of the polarized illuminator suffers from a large angle differential between the normal axes of the imager(s) of the reader and the polarized illumination produced via the polarized illuminator. As the range between the reader and the target object to be imaged increases, such an angle differential causes decreases in uniformity of the projected polarized illuminator. The lack of uniformity may cause diminished capacity to capture an image sufficient for accurately detecting and/or decoding machine-readable symbologies therein.

Some readers may attempt to improve the co-axial nature of the polarized illumination as compared to the normal axes of the imager(s) of the reader utilizing extra components. However, such additional components increase the size of the overall reader to account for the tolerances and size of such components. Furthermore, additional components add cost and complexity to manufacture of the reader. A beam splitter, for example, may be utilized to attempt to improve the co-axial nature of these axes, but adds space that prevents usage of such component arrangements within small form factor readers. As such, it is desirable to utilize an improved near co-axial polarized illuminator that reduces the angle differential between the normal axes of the imagers and the central axis of the polarized illumination towards the same direction (e.g., a forward direction of the reader) while minimizing the overall size required to fit all such components in a small form factor.

Embodiments of the present disclosure provide an improved near co-axial polarized illuminator apparatus. The improved near co-axial polarized illuminator apparatus is specially designed to position a polarized illuminator in preferred, close near co-axial alignment with imagers of such embodiments. The improved near co-axial polarized illuminator apparatus reduces the angle differential between imager(s) of the reader and the polarized illuminator in a minimized form factor and without large, additional components. In this regard, embodiments of the present disclosure remain of a small form factor while enabling uniform and improved illumination from the polarized illuminator with a smaller offset from the corresponding imagers throughout a greater range (e.g., closer when illuminating an object near to the reader, and closer when illuminating objects at greater distances). Such decreased offset reduces polarized illumination orientation error to improve the image contrast and uniformity when applied to machine-readable symbologies on particular objects, particularly with respect to surfaces of highly reflective objects. Such embodiments may be utilized in a variety of contexts, including single-imager readers having only the polarized illuminator or the polarized illuminator together with additional illuminator types, dual-imager readers having only the polarized illuminator or the polarized illuminator together with additional illuminator types, and multi-imager readers having only the polarized illuminator or the polarized illuminator together with additional illuminator types—each while maintaining a smaller form factor than existing arrangements.

Definitions

The term "near co-axial" refers to alignment of two or more axes within a tolerance angle differential from one another. In some embodiments, near co-axial alignment includes a polarized illuminator with minimized angle differential with a normal angle to a DPM channel image sensor and a normal angle of a standard range channel image sensor.

The term "DPM channel field of view" refers to a defined field of view that is narrower in at least one dimension than another capturable field of view. In some embodiments, the other capturable field of view represents a standard range channel field of view. In some embodiments, the DPM channel field of view is defined by an 11 mm field of view focused for 2 mil enhancement.

The term "standard range channel field of view" refers to a defined field of view that is broader in at least one dimension than another capturable field of view. In some embodiments, the other capturable field of view represents a DPM channel field of view. In some embodiments, the standard range channel field of view defines a field of view of 48 degrees for capturing at a further focused distance.

The term "DPM channel image sensor" refers to a sensor embodied in hardware, software, firmware, and/or a combination thereof, that captures image data corresponding to light incident on the sensor from within a field of view representing a DPM channel field of view defined by a corresponding DPM channel lens. Non-limited examples of a DPM channel image sensor include a CMOS sensor and a CCD sensor.

The term "standard range channel image sensor" refers to a sensor embodied in hardware, software, firmware, and/or a combination thereof, that captures image data corresponding to light incident on the sensor from within a field of view representing a standard range channel field of view defined by a corresponding standard range channel lens. Non-limited examples of a standard range channel image sensor include a CMOS sensor and a CCD sensor.

The term "DPM channel lens" refers to one or more optical component(s) that define a DPM channel field of view capturable by a corresponding DPM channel image sensor. In some embodiments, the DPM channel field of view is narrower in at least one dimension than a corresponding standard range channel field of view, and/or associated with a longer focal length than the standard range channel field of view.

The term "standard range channel lens" refers to one or more optical component(s) that define a standard range channel field of view capturable by a corresponding standard range channel image sensor. In some embodiments, the standard range channel field of view is broader in at least one dimension than a corresponding DPM channel field of view, and/or associated with a shorter focal length than the DPM channel field of view.

The term "near co-axial polarizer light source" refers to circuitry embodied in hardware, software, firmware, and/or a combination thereof, that produces light towards a polarizer in near co-axial alignment with one or more image sensor(s). Non-limiting examples of a near co-axial polarizer light source refers to one more LED(s) that, upon activation, produces light towards a corresponding polarizer.

The term "near co-axial polarizer" refers to at least one polarizing filter that polarizes light produced via a near co-axial polarizer light source.

The term "near co-axial polarizer lens" refers to at least one optical component that projects light from a near co-axial polarizer light source in a particular pattern.

The term "illumination board" refers to a printed circuit board including a defined portion for electronically coupling to a near co-axial polarized light source in near co-axial alignment with at least one image sensor.

The term "jut out" refers to a portion of a printed circuit board that extends from a main portion of the printed circuit board and is surrounded by an empty space on a majority of sides.

The term "near co-axial aimer light source" refers to light producing circuitry utilized to produce an aimer illumination. Non-limiting examples of a near co-axial aimer light source includes a laser or high-powered LED.

The term "processor" refers to circuitry embodied in hardware, software, firmware, and/or a combination thereof that performs a computer-implemented process utilizing received and/or produced data signal(s). Non-limiting examples of a processor include a microprocessor, an integrated circuit, and a central processing unit.

The term "image processing algorithm" refers to a computer-implemented process that processes image data for a particular defined task.

The term "side adjacent" refers to an alignment of a component with a particular midpoint between two or more components.

The term "board" refers to circuitry that receives electrical components to electronically couple such component and enables transmission of electronic signals between such components. Non-limiting examples of a board include a flexible printed circuit board and a rigid printed circuit board.

The term "aimer folding optics" refers to one or more optical component(s) that reorient a direction of light utilized to produce an aimer illumination.

The term "assembly" refers to any combination of two or more component(s) that are physically and/or chemically connected, affixed, secured, and/or otherwise attached.

The terms "machine-readable symbology" and "code" refer to an encoded representation of data that is detectable and decodable by hardware, software, firmware, and/or a combination thereof via an image including a depiction of the encoded representation. A machine-readable symbology may be detectable and/or decodable by a computing device and a human user, or detectable and/or decodable only by a computing device. Non-limiting examples of a machine-readable symbology include a quick response code, a barcode, a Datamatrix code, and an encoded image representation of data.

Example Near Co-Axial Polarized Illuminator Apparatus General Use Contexts and Implementation FIG. 1 illustrates a block diagram of an example context for uses of improved near co-axial polarized illuminator apparatuses in accordance with at least an example embodiment of the present disclosure. Specifically, FIG. 1 depicts an example near co-axial polarized illuminator apparatus 100 utilized for reading one or more machine-readable symbologies. In some embodiments, the near co-axial polarized illuminator apparatus 100 embodies a reader configured for machine-readable symbology detecting and decoding in captured image representations.

In some embodiments, the near co-axial polarized illuminator apparatus 100 includes a plurality of imager(s) and/or a plurality of illuminator(s) that enable machine-readable symbology capturing and/or processing in various contexts. In some embodiments for example, the near co-axial polarized illuminator apparatus 100 utilizes one or more illuminator(s) and/or one or more imager(s) to capture an image representation of a machine-readable symbology 102 printed on, affixed to, or otherwise associated with a particular object 104. Additionally or alternatively, in some embodiments, the near co-axial polarized illuminator apparatus 100 utilizes one or more illuminator(s) and/or one or more imager(s) to capture an image representation of a machine-readable symbology 106 embodying a direct part marking on an object 108.

It will be appreciated that the different manners in which the machine-readable symbology is presented associated with the corresponding object may change the impact of different illuminators on the ability of the near co-axial polarized illuminator apparatus 100 to capture processable image(s). For example, the machine-readable symbology 102 may be printed on a label or otherwise separate from the material of the object 104 itself, such as on a paper, tag, label, and/or the like. The near co-axial polarized illuminator apparatus 100 in some embodiments includes any number of illuminators that may sufficiently illuminate the machine-readable symbology 102 for capturing via an image representation suitable for successful processing. Comparatively, in some embodiments the direct part marking machine-readable symbology 106 on the object 108 may be greatly affected by the specular properties of the material of the object 108. In one example context where the object 108 is highly speculative, for example, certain illuminations projected by the near co-axial polarized illuminator apparatus 100 may cause significant specular reflection that makes processing of the captured image for machine-readable symbology detection and/or decoding impractical or impossible. In some such contexts, use of particular illuminators in the near co-axial polarized illuminator apparatus 100 enables capturing of images including an illuminated representation of the machine-readable symbology 106 in a manner sufficiently illuminated for further processing.

In particular contexts, a polarized illuminator is utilized to illuminate a machine-readable symbology and capture a representation of the machine-readable symbology sufficiently illuminated to enable accurate processing for detection and/or decoding of the machine-readable symbology therein. For example, in some embodiments a polarized illuminator is desired for illuminating the machine-readable symbology 106 to minimize or eliminate the negative effects of specular reflection from the surface of the object 108. Similarly, in some embodiments a polarized illuminator is desired for illuminating the machine-readable symbology 102, for example to minimize the effects of the tag or label upon which the machine-readable symbology 102 is printed. The angle at which the polarized illuminator projects a polarized illumination, however, greatly affects the effectiveness of the polarized illumination sufficiently illuminating particular machine-readable symbologies, for example on highly reflective surfaces, with sufficient illumination and without reflection. In this regard, it is advantageous to include the polarized illuminator while minimizing the offset of the polarized illumination from the normal axis of the image sensor(s) capturing the image representation of the machine-readable symbology for processing.

The near co-axial polarized illuminator apparatus 100 includes a near co-axial polarized illuminator specially designed to reduce the offset of angles between the normal axis of the image sensor(s) and the projected polarized illumination. In this regard, the particular arrangement of the near co-axial polarized illuminator apparatus 100 enables such offset to be minimized as compared to alternative arrangements including a polarized illuminator. Additionally or alternatively, if desired, the particular arrangement of the near co-axial polarized illuminator apparatus 100 enables reduced total size of the assembly in one or more directions by confining the polarized illuminator within the dimensions required to house the imager(s), other illuminator(s), and/or processing circuitry thereof.

FIG. 2 illustrates a block diagram of an example apparatus that may be specially configured in accordance with at least an example embodiment of the present disclosure. Specifically, FIG. 2 depicts an example near co-axial polarized illuminator apparatus 200 ("apparatus 200") specially configured in accordance with at least some example embodiments of the present disclosure. In some embodiments, the intermediary integration system 106 is embodied by one or more system(s), such as the apparatus 200 as depicted and described in FIG. 2. The apparatus 200 includes processor 202, memory 204, input/output circuitry 206, communications circuitry 208, imager(s) 210, illuminator(s) 212, and control circuitry 214. In some embodiments, the apparatus 200 is configured, using one or more of the sets of circuitry 202, 204, 206, 208, 210, 212, and/or 214, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with reading operation(s) using a near co-axial polarized illuminator. In some embodiments, the processor 202 includes hardware, software, firmware, and/or a combination thereof, that generates signal(s) that controls activation of at least one illuminator to produce an illumination, including a near co-axial polarized illuminator to generate a corresponding near co-axial polarized illumination. Additionally or alternatively, in some embodiments, the processor 202 includes hardware, software, firmware, and/or a combination thereof, that generates signal(s) that controls activation at least one image sensor to capture image data representing a particular field of view. Additionally or alternatively, in some embodiments, the processor 202 includes hardware, software, firmware, and/or a combination thereof, that receives image data from an image sensor that captured said image. Additionally or alternatively, in some embodiments, the processor 202 includes hardware, software, firmware, and/or a combination thereof, that processes a captured image using one or more particular image processing algorithm(s), for example to perform detection and/or decoding of at least one machine-readable symbology represented in the captured image. Additionally or alternatively, in some embodiments, the processor 202 includes hardware, software, firmware, and/or a combination thereof, that outputs data resulting from the one or more image processing algorithm(s).

In some embodiments, the apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

In some embodiments, the apparatus 200 includes communications circuitry 200. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from a system associated with a converted data access application system and/or a user-accessed application system, and/or another external device in communication with the apparatus 200.

The imager(s) 210 includes any number of imager(s) that each enable capture of image data embodying an image. Each imager in some embodiments includes optic(s) and/or circuitry embodied in hardware, software, firmware, and/or a combination thereof, that activates to capture and/or output an image representing a particular field of view. In some embodiments, the imager(s) 210 includes a single imager. In some embodiments, the imager(s) 210 includes a plurality of imager(s), each configured to capture a different field of view. In some embodiments, the imager(s) 210 are aligned such that normal axes of the imager(s) 210 are parallel with one another, for example each facing in a forward-facing direction. In some embodiments, for example, the apparatus 200 includes a DPM channel imager and a standard range channel imager that abut one another and face parallel to a forward-facing axis of the apparatus 200. In some embodiments, each imager of the imager(s) 210 includes at least one optical component (e.g., a lens, reflector, mirror, refractor, and/or the like) and at least one image sensor aligned with the at least one optical component to defined the capturable field of view associated with that imager. The image sensor of the imager may generate an image corresponding to the attenuation of light on the image sensor thereof. In some embodiments, the imager(s) 210 include one or more CMOS or CCD image sensor(s) aligned with one or more lens(es) that define a capturable field of view.

The illuminator(s) 212 includes any number of illuminator(s) that each enable projection of an illumination within a field of view. Each illuminator in some embodiments includes a light source and at least one optic that projects a particular illumination pattern into a field. In some embodiments, the illuminator(s) 212 are aligned in different manners that enable production of a particular desired illumination. In some embodiments, the illuminator(s) 212 includes at least one bounce illuminator, at least one dark field illuminator, at least one diffusion illuminator, and/or at least one edge illuminator, at least one DPM channel illuminator, and/or at least one near co-axial polarized illuminator. In some embodiments, the near co-axial polarized illuminator of the illuminator(s) 212 is in near co-axial alignment with one or more of the imager(s) 210, such that the polarized illumination remains with reduced angle offset from the normal axis of the imager(s) 210. In this regard, the polarized illumination projected via the polarized illuminator of the illuminator(s) 212 may be projected into the field(s) of view capturable via the imager(s) 210 with minimal angle difference between the normal axes of the field(s) of view and the polarized illumination. In some embodiments, the illuminator(s) 212 include one or more light emitting diode(s) aligned with one or more lens(es) that define a particular illumination pattern to be projected.

The optional control circuitry 214 includes hardware, software, firmware, and/or a combination thereof, that supports operation(s) facilitated, in whole or in part, associated with controlling activation of one or more component(s) of the apparatus 200. For example, in some embodiments, the control circuitry 214 includes hardware, software, firmware, and/or a combination thereof, that receives an input signal indicating a user-initiated trigger of the apparatus 200. Additionally or alternatively, in some embodiments, the control circuitry 214 includes hardware, software, firmware, and/or a combination thereof, that generates and/or otherwise transmits a signal to activate or deactivate one or more illuminator(s). Additionally or alternatively, in some embodiments, the control circuitry 214 includes hardware, software, firmware, and/or a combination thereof, that generates and/or otherwise transmits a signal that activates or deactivates one or more imager(s) to capture an image. Additionally or alternatively, in some embodiments, the control circuitry 214 includes hardware, software, firmware, and/or a combination thereof, that processes user input adjusting a mode of operation of the apparatus 200, for example to cause activation of particular illuminator(s) and/or imager(s) in a particular sequence. In some embodiments, control circuitry 214 includes a separate processor, specially configured field programmable gate array (FPGA), or a specially programmed application specific integrated circuit (ASIC).

Additionally or alternatively, in some embodiments, two or more of the sets of circuitries 202-214 are combinable. Alternatively or additionally, in some embodiments, one or more of the sets of circuitry perform some or all of the functionality described associated with another component. For example, in some embodiments, two or more of the sets of circuitry 202-214 are combined into a single module embodied in hardware, software, firmware, and/or a combination thereof. Similarly, in some embodiments, one or more of the sets of circuitry, for example the control circuitry 214, is/are combined with the processor 202, such that the processor 202 performs one or more of the operations described above with respect to each of these sets of circuitry 210-214.

Example Reader Apparatuses and Arrangements of Near Co-Axial Polarized Illuminator Apparatus Therein of the Disclosure Having described example contexts of use and configuration of near co-axial polarized illuminator apparatuses in accordance with the present disclosure, specific example near co-axial polarized illuminator apparatuses, arrangements, and readers including such apparatuses and/or arrangements will now be discussed. It will be appreciated that a near co-axial polarized illuminator apparatus in other embodiments may include alternative and/or additional components. In some embodiments, the near co-axial polarized illuminator apparatus embodies an imaging engine for integration within a reader, for example such that the imaging engine may be utilized in one or more additional and/or alternative application(s) as well.

FIG. 3 illustrates a front view of an example near co-axial polarized illuminator apparatus embodying an improved reader in accordance with at least an example embodiment of the present disclosure. Specifically, FIG. 3 illustrates an example improved reader 300 including a near co-axial polarized illuminator apparatus in accordance with the present disclosure. In some embodiments, the improved reader 300 embodies an implementation of the apparatus 200. FIG. 3 illustrates a front view of the improved reader 300 while fully assembled. This view depicts an opening depicting the various components that are outward-facing, such that light may be produced via such components from an inside cavity of the improved reader 102 by illuminator(s) therein, and/or such that reflected light may flow in towards imager(s) of the improved reader 300.

The improved reader 300 is specially configured to include a plurality of other illuminator types as well, for example to enable projection of different illumination types for use in illuminating machine-readable symbologies provided via different mediums and/or in different contexts (e.g., highly speculative machine-readable symbologies as opposed to high contrast machine-readable symbologies as opposed to indented machine-readable symbologies as opposed laser marked machine-readable symbologies). In other embodiments, the improved reader 102 may include a near co-axial polarized illuminator together with a different combination of alternative illuminator types, for example only one of the other illuminator types as depicted and/or described, or a subset of the one or more other illuminator types as depicted and/or described. In this regard, it will be appreciated that the improved reader 300 should not be limited to requiring all of the alternative illuminator types as depicted and described with respect to FIG. 3.

As illustrated in FIG. 3, the reader 300 includes a ring illuminator assembly that comprises a plurality of illuminators surrounding an opening of the reader 300. The opening in some embodiments is defined by a diffuser illuminator. As illustrated, the ring illuminator assembly includes a plurality of narrow field illuminators 310A, 310B, 310C, and 310D. In some embodiments. Each narrow field illuminator produces a concentrated illumination, which has a high intensity and/or focused beam of light extending to further ranges than broader illuminators. In some embodiments, each narrow field illuminator 310A-310D comprises at least one optical lens and a narrow field light source (e.g., without a polarizer). It will be appreciated that in some embodiments, the reader 300 comprises a plurality of narrow field illuminators located opposite one another over a particular axis, for example located at each corner of the ring illuminator assembly.

The ring illuminator assembly further includes a plurality of edge illuminators, each embodying a dark field illuminator of the improved reader 300. Specifically, the ring illuminator assembly includes edge illuminators 312A, 312B, 312C, and 312D. Each of the edge illuminators 312A-312D is positioned along a different edge of the ring illuminator assembly, for example a top edge illuminator 312A, a right edge illuminator 312B, a bottom edge illuminator 312C, and a left edge illuminator 312D. In some embodiments, the edge illuminators 312A-312D are each configured to produce the same or similar illuminations, such that the illuminations combine to illuminate a field of view uniformly and at a high angle of incidence for a particular field of view near to the reader 300.

The reader 300 further includes a diffuser illuminator 306. The diffuser illuminator 306 is positioned behind the ring illuminator assembly, such that the opening defined by the ring of the ring illuminator assembly allows for the diffuser illuminator 306 to project a diffuse illumination towards the front of the improved reader 300. In this regard, the diffuser illuminator 306 projects the diffuse illumination into one or more field(s) of view capturable by the improved reader 300. For example, in some embodiments, the diffuser illuminator 306 receives light from behind a diffuser and produces a uniform, scattered illumination from such light via the opening defined by the diffuser and corresponding to the inside of the ring illuminator assembly. In some embodiments, the diffuser illuminator 306 includes a narrower opening at the back of the diffuser illuminator that enables light to reach the imagers therein.

The reader 300 further includes a near co-axial polarized illuminator 302. The near co-axial polarized illuminator 302 a polarizer, a polarized light source, and one or more optics that define the polarized illumination. The polarized illumination illuminates one or more fields of view capturable by the imager(s) of the improved reader 300. The polarized illumination is polarized at a particular orientation defined by the polarizer of the polarized illuminator 302, where the improved reader 300 includes an analyzer that filters out light of such orientation.

The near co-axial polarized illuminator 302 is positioned side adjacent to a central point between the imagers 308A and 308B. In this regard, the near co-axial polarized illuminator 302 is specifically positioned to minimize the angle differential between the normal axes oof the imagers 308A and 308B with the normal axis of the polarized illumination. Such a configuration is functional even in circumstances where the size of the reader 300 prevents components from being positioned directly between the imagers 308A and 308B without offsetting the fields of view captured by such imagers by an unacceptable amount. Additionally, such close proximity to the imagers 308A and 308B enables a smaller overall size of the improved reader 300 include all such components therein.

The improved reader 300 further includes a plurality of imagers. Each imager defines a field of view capturable by the imager. Specifically, the improved reader 300 includes a narrow field imager 308A embodying a DPM channel imager, and a wide field imager 308B embodying a standard range channel imager. In this regard, the narrow field imager 308A in some embodiments captures a DPM channel field of view that is narrower in one or more directions than a standard range channel field of view capturable via the wide field imager 308B. Additionally or alternatively, the narrow field imager 308A in some embodiments captures a DPM channel field of view associated with a longer focal length than a focal length corresponding to the wide field of view. As light reflects back into the opening defined by the ring illuminator assembly and through the opening defined by the back of the diffuser illuminator 306, such light impacts or otherwise interacts with one of the imagers 308A or 308B. In this regard, illuminations produced by any one or more of the illuminators 302, 310A-310D, 312A-312B, and/or 306 may reflect off object(s) and/or machine-readable symbologies in the fields of view of the reader 302 (e.g., objects including the machine-readable symbology or symbologies to be scanned), and subsequently be captured by the imagers to generate images representative of such fields of view. In some embodiments, the narrow field imager 308A and wide field imager 308B are positioned in any orientation, for example with the narrow field imager 308A positioned above the wide field imager 308B, or in other embodiments the wide field imager 308B is positioned above the narrow field imager 308A.

The improved reader 300 further includes an aimer illuminator 304. The aimer illuminator 304 includes an aimer light source and at least one optic to project an aimer illumination. The aimer illuminator 304 projects an aimer illumination through the openings of the diffuser illuminator 306 and the ring illuminator assembly. In some embodiments, as described herein, the aimer illuminator 304 includes one or more reflectors that redirect the aimer illumination in a near co-axial direction with respect to central axes of the fields of view captured by the narrow field imager 308A and/or wide field imager 308B. In some embodiments, the reflector and/or aimer light source of the aimer 304 is positioned such that the aimer illumination is produced with reduced offset from the viewing axis of the improved reader 300 as defined by the imagers thereof. In this regard, in some embodiments a reflector is positioned side adjacent to a central point between the imagers 308A and 308B. Such configurations are functional even in circumstances where the size of the reader 300 prevents components from being positioned directly between the imagers 308A and 308B without offsetting the fields of view captured by such imagers by an unacceptable amount. In other embodiments where the size of the reader 300 is larger and minor offsets between such fields of view are allowable, for example, the aimer light source and/or a reflector is/are positioned between the imager 308A and imager 308B.

It will be appreciated that the particular arrangement of the aimer 304 as depicted is merely exemplary, and in other embodiments one or more subcomponents thereof may be repositioned, moved, replaced, and/or the like. For example, in some embodiments, the position of the narrow field imager and the position of the wide field imager are swapped. Alternatively or additionally, in some embodiments, the position of the polarized illuminator and the position of the aimer illuminator are swapped. Alternatively or additionally, in some embodiments, an analyzer is positioned over any one of the imagers, or over both of the imagers.

FIG. 4A illustrates a perspective view of fields of view and illumination of said fields of view for a near co-axial polarized illuminator apparatus in accordance with at least an example embodiment of the present disclosure. FIG. 4B illustrates a forward view of fields of view and illumination of said fields of view for a near co-axial polarized illuminator apparatus in accordance with at least an example embodiment of the present disclosure. FIGS. 4A and 4B depict different views of an improved reader 300 during operation of the improved reader 300. Specifically, FIGS. 4A and 4B depict fields of view capturable by the improved reader 300 together with a projected polarized illumination by a near co-axial polarized illuminator and an aimer illumination projected by a near co-axial aimer illuminator.

As illustrated, the improved reader 300 captures a standard range channel field of view 408 and a DPM channel field of view 406. The standard range channel field of view 408 represents a first, wide field of view that is broader than the second, narrow field of view embodied by the DPM channel field of view 406 in one or more directions. The standard range channel field of view 408 is aligned with the DPM channel field of view 406 in a forward-facing direction of the improved reader 300. In this regard, the standard range channel field of view 408 and the DPM channel field of view 406 are sufficiently aligned such that the standard range channel field of view 408 includes the DPM channel field of view 406. In some embodiments, the standard range channel field of view 408 is defined based at least in part on optical element(s), for example one or more lens(es), of a standard range channel imager of the improved reader 300 that directs light to a corresponding standard range channel image sensor. In some embodiments, the DPM channel field of view 406 is defined based at least in part on optical element(s), for example one or more lens(es), of a DPM channel imager of the improved reader 300 that redirects light to a corresponding DPM channel image sensor. The lens(es) or other optical component(s) may differ between the DPM channel imager and the standard range channel imager to define the different dimension(s) and/or focal length(s) associated with such imager(s). It will be appreciated that the standard range channel field of view 408 may be associated with a first focal length that is focused further to the improved reader 300 than the DPM channel field of view 406.

The improved reader 300 projects the polarized illumination 402. As illustrated, the polarized illumination 402 is projected in near co-axial alignment with each of the DPM channel field of view 406 and the standard range channel field of view 408. In this regard, the polarized illuminator projects a near co-axial polarized illumination 402 that illuminates at least a portion of each of the DPM channel field of view 406 and the standard range channel field of view 408 in a manner that maintains the near co-axial relationship between each of the fields of view and the illumination itself. Utilizing the near co-axial alignment with the DPM channel imager and the standard range channel imager that project the standard range channel field of view 408 and DPM channel field of view 406 respectively, the improved reader 300 is configured to project the polarized illumination 402 in a manner that maintains the co-axial alignment with the both fields of view 406 and 408 at greater distances. Specifically as illustrated, the polarized illumination 402 illuminates the entirety of the DPM channel field of view 406 and at least the corresponding portion of the standard range channel field of view 408.

In some embodiments, the improved reader 300 further include an aimer that projects an aimer illumination, for example the aimer illumination 404. As illustrated, the improved reader 300 projects an aimer illumination in near co-axial alignment with each of the fields of view 406 and 408 as well as the polarized illumination 402. In this regard, the near co-axial aimer illumination 404 may be utilized to orient the improved reader 300 towards a machine-readable symbology in a manner that enables capture of a representation of the machine-readable symbology by the imager(s) associated with the fields of view 406 and/or 408 as illuminated by the polarized illumination 404.

FIG. 5 illustrates an exploded view of an example near co-axial polarized illuminator apparatus embodying an improved reader in accordance with at least an example embodiment of the present disclosure. Specifically, FIG. 5 depicts an exploded view of an example implementation of the improved reader 300. The exploded view depicts a plurality of components arranged to form the reader 300. As described herein, in some embodiments the components of the reader 300 are arranged, for example as depicted, to reduce the overall size of the reader 300 while simultaneously enabling projection of a near co-axial polarized illumination into a plurality of fields.

As illustrated in FIG. 5, the reader 300 includes an apparatus chassis (e.g., a "chassis") that houses components of the reader 300. Specifically, the reader 300 includes chassis portion 502A embodying a top portion of a chassis, and chassis portion 502B embodying a bottom portion of the chassis. In some embodiments, the chassis portion 502A and the chassis portion 502B are configured to be affixed, connected, or otherwise coupled to form a complete housing, for example by snapping together to enclose all components of the reader 300. In some embodiments, the chassis portion 502A and the chassis portion 502B are mechanically secured, chemically sealed, and/or the like, to enclose all such components. It will be appreciated that, in other embodiments, the chassis of the reader 300 includes multiple other chassis portions.

Additionally or alternatively, in some embodiments, the chassis embodies or includes one or more portions representing external components utilized for holding, positioning, and/or operating the reader 300. For example, as illustrated the chassis portion 502B includes handle a handle. The handle embodies an external, elongated portion of the chassis that is designed to enable a user to place their hand around the reader 300 and orient the reader 300 towards a code to be read. In some embodiments, the handle is angled to enable a user to comfortably angle the reader 102 in a manner such that illuminations produced via the reader 300 reach a code to be scanned while minimizing the likelihood of direct light reflection from such illuminations impacting sensor(s) of the reader 300. Additionally or alternatively, in some embodiments, one or more portion(s) of the chassis embody, house, or otherwise include components for activating the reader 300 (e.g., a trigger), setting an operational mode of the reader 300, and/or the like.

The reader 300 further includes a ring lens 504. In some embodiments, the ring lens 504 comprises optical components for generating particular illumination(s) from light produced by any number of illuminators of a ring illuminator assembly. In some embodiments, for example, the ring lens 504 includes edge optical components relatively centered along the top, bottom, left, and right edges of the ring lens 504 for producing one or more dark field illuminations from illuminators relatively aligned with such edge optical components. Additionally or alternatively, in some embodiments, the ring lens 504 includes corner optical components associated with a standard range channel illuminator that outputs condensed light to such lens(es), which are subsequently utilized to illuminate one or more fields of view.

The reader 300 further includes a board 506. In some embodiments, the board 506 comprises a single, particular circuitry board (e.g., a PCB) that includes a plurality of activatable illuminators. The board 506 is structured as a ring that defines a void or hole in the center of the ring that allows for passage of light in to and/or out of one or more components behind the ring, for example via the diffuser 508 as described herein. In this regard, it will be appreciated that the ring shape similarly enables alignment of the illuminators of board 506 with the corresponding optical components of the ring lens 504 having the same or a similar ring shape without impeding the passage of light via the void or holes in said ring.

In some embodiments, the board 506 includes one or more edge illuminators, for example positioned centrally or relatively centrally (e.g., within a determinable acceptable tolerance distance) from the center of the left edge, the right edge, the top edge, and the bottom edge of the board 506. Such illuminators in some embodiments embody dark field illuminators to be used for dark field imaging by providing high incidence light at close distances from a particular field of view. These dark field illuminators in some embodiments are aligned with particular corresponding optical components of the ring lens 504, for example optical lenses positioned at each of the top, right, bottom, and left edges of the ring lens 504. In this regard, the associated dark field illuminator of the board 506 and corresponding optical components of the ring lens 504 form a plurality of dark field illuminator assemblies that each produce dark field illuminations.

Further still, in some embodiments the board 506 includes at least one illuminator embodying a narrow field illuminator, for example at least one illuminator positioned at the bottom left corner of the board 506 and at least one illuminator positioned at the bottom right corner of the board 506. These illuminators are aligned with corner optical components of the ring lens 504, for example forming narrow field illuminator assemblies that each produce a narrow field illumination. For example, in some embodiments the light produced via the narrow field illuminators of the board 506 are produced and corresponding condensed narrow field illuminations are produced through the corresponding optical components of the ring lens 308 aligned with said illuminators.

In some embodiments the particular arrangement, orientation, and positions of the illuminator assemblies discussed with respect to the components 504 and/or 506 may differ from that depicted in the figures herein. For example, in some embodiments, less corner illuminator(s) may be utilized. Additionally or alternatively, in some embodiments one or more of the dark field illuminator assemblies may differ from one another (e.g., different strength illuminators, different optical components to produce different illuminations, and/or the like), and in other embodiments the dark field illuminator assemblies may each be the same with differing rotations from the central axis of the field of views capturable via the reader 300.

The reader 300 further includes diffuser 508. The diffuser 508 scatters incoming light to produce an illumination that is more balanced or uniform illumination (e.g., without significant pockets of increased dark or light spots). In some embodiments, the diffuser 508 embodies a dome diffuser that generally embodies a dome-like structure. In such embodiments, the dome-like structure scatters the light in various directions, thus diffusing the light throughout a field of view. In some such embodiments, the dome structure defines an outer perimeter that enables the passage of light out of the diffuser (e.g., a diffuse illumination produced via the diffuser 508 and corresponding components of a diffuser assembly and passage of light inwards towards image sensor(s) behind the diffuser 508. In some such embodiments, one or more components of a ring illuminator assembly, for example the ring lens 504 and/or board 506, are affixed to the diffuser 508 along the perimeter or corners of the outer perimeter of the diffuser 508 to ensure alignment of such components. It will be appreciated that in some embodiments, other light diffuser mechanisms may be utilized in place or additional to the diffuser 508. In some embodiments, the diffuser 508 is semi-transparent to enable incoming light to be diffused via the diffuser 508 into a more uniform illumination.

The reader 300 further includes a diffuser back light reflector 516. The diffuser back light reflector 516 receives incoming light from one or more illuminators (e.g., diffuser illuminators) and directs such light into the diffuser 508. For example, in some embodiments, the diffuser back light reflector 516 comprises one or more optical components that that directs light from any number of illuminators to one or more points along the diffuser 508, such that the diffuser 508 receives the light and produces a diffuse illumination utilizing such incoming light. In some embodiments, the diffuser back light reflector 516 embodies a single molded optical component. In other embodiments, the diffuser back light reflector 516 embodies separate optical components affixed together or positioned in alignment with one another.

In some embodiments, the diffuser back light reflector 516 performs various securing and illumination functions. For example, in some embodiments, the diffuser back light reflector 516 is aligned with the diffuser 508 such that incoming light (e.g., from one or more illuminators of the board 520, as described herein) is reflected or otherwise directed to the back of the diffuser 508 to produce a corresponding uniform diffuse illumination. Additionally or alternatively, in some embodiments, the diffuser back light reflector 516 couples or otherwise secures one or more components of a diffuser illuminator assembly in alignment with one or more other components. For example, in some embodiments, the diffuser back light reflector 516 tightly secures the protective window 514 to the back of the diffuser 508. Additionally or alternatively, in some embodiments, the diffuser back light reflector 516 is configured to receive one or more securing mechanism(s) of another component, for example one or more illumination lenses and/or of a ring illuminator assembly, to secure such components alignment with one or more other components.

The reader 300 further includes a protective window 514. In some embodiments, the protective window 514 includes one or more optical elements that enable light to pass through the protective window, while simultaneously protecting imager(s) and/or other component(s) of the reader 300 from external objects, impediments, and/or the like. In some embodiments, the protective window 514 includes a reinforced or secure glass or transparent plastic lens in a secured housing. In this regard, the protective window 514 may prevent object(s) from impacting components behind the protective window 514 without affecting light flowing through the protective window 514.

The reader 300 further includes polarizer 512. In some embodiments, the polarizer 512 embodies optical filters that permits light of particular polarization through while filtering light of other polarizations. In this regard, the polarizer 512 produces a polarized illumination from one or more illuminations that shines towards the polarizer 512, for example produced by one or more polarized illuminator light generation source(s). In this regard, the polarizer 512 may be part of a polarized illuminator that projects a polarized illumination of a particular polarization into the field(s) of view capturable by the improved reader 300.

In some embodiments, the polarizer 512 is affixed to the protective window 514. For example, in some embodiments, the protective window 514 includes a defined slot or securing mechanism that attaches to and/or positions the polarizer 512. In some embodiments, the polarizer 512 is affixed to the protective window 514 in a manner that aligns the polarizer with one or more other component(s) of a near co-axial polarized illuminator, for example the polarized illuminator lens 518 and/or the near co-axial polarizer light source 534 as depicted and described herein. In this regard, in some such embodiments the protective window 514 embodies a polarizer holder that secures the polarizer 512.

The reader 300 further includes an analyzer 510. In some embodiments, the analyzer 510 comprises a polarized optical component that filters out light of particular polarizations. In this regard, the analyzer 510 blocks light of unwanted polarizations to eliminate or reduce the effects of unwanted light on the image sensors positioned behind the analyzer 510. In some embodiments, the analyzer 510 comprises a polarizer that allows light of the crossed polarities than a polarizer of a near co-axial polarized illuminator of the reader 300. For example, as illustrated, in some embodiments the analyzer 510 blocks same polarizations from a first polarization permitted by polarizer 512. In this regard, the analyzer 510 prevents unwanted incidence of light from reaching the image sensors therein. In some embodiments, the analyzer 510 is optionally included.

In some embodiments, the analyzer 510 is affixed to the protective window 514. For example, in some embodiments, the protective window 514 includes a defined slot or securing mechanism that attaches to and/or positions the analyzer 510. In some embodiments, the analyzer 510 is affixed to the protective window 514 in a manner that aligns the analyzer 510 with one or more other component(s) of a near co-axial polarized illuminator, for example a DPM channel imager and/or a standard range channel imager as depicted and described herein. In some embodiments, the analyzer 510 is specifically positioned in front of a DPM channel imager to further minimize the effects of off-axis illumination impacting the corresponding DPM channel imager. In this regard, in some such embodiments the protective window 514 embodies an analyzer holder that secures the analyzer 510. In some embodiments, the analyzer 510 is positioned towards the back end of the diffuser 508, for example in alignment with an opening of the diffuser 508 and one or more lens(es) associated with imagers of the reader 300.

The reader 300 further includes a board 520. In some embodiments, the board 520 comprises a single particular circuitry board (e.g., a PCB) that includes one or more activatable light source(s) utilized in generating a diffuse illumination via the diffuser 508 and diffuser back light reflector 516. For example, in some embodiments, the board 520 includes one or more diffuse light source(s) aligned with the diffuser back light reflector 516. In some embodiments, the board 520 defines a void space or hole that enables one or more lens(es) to be positioned near the center of the board 520. In this regard, the board 520 may include one or more diffuser illuminator light source(s) on either and/or side(s) of the hole in the board 520, on top or bottom of the hole in the board 520, and/or the like, to provide sufficient light for directing via the diffuser back light reflector 516. In some embodiments, the board 520 includes a plurality of diffuser illuminators that provide relatively uniform light at various points throughout the diffuser back light reflector 516. These diffuser illuminators of the board 520 together with the corresponding diffuser 508 and diffuser back light reflector 516 form a diffuser assembly that produces diffuse illuminations.

The board 520 further includes a near co-axial polarizer light source 534. In some embodiments, the improved reader 300 includes the near co-axial polarized light source 520 at a position that reduces or otherwise minimizes the angle differential between the axis of the near co-axial polarized light source 520 and one or more image sensor(s) of the improved reader 300, for example in a DPM channel imager and a standard range channel imager. In some embodiments, the near co-axial polarizer light source 534 is positioned side-adjacent to a DPM channel image sensor and a standard range channel image sensor of the improved reader 300. In this regard, the near co-axial polarized light source 520 may be adjacent to an axis in a forward-facing direction of the improved reader 300 that falls between the DPM channel image sensor and the standard range channel image sensor.

In some embodiments, the board 520 includes a particular position at which the near co-axial polarizer light source 534 is securable. For example, in some embodiments, the board 520 includes a jut out that extends into the hole in the board 520 to enable passage of lens(es) and/or light through such hole(s) in the board 520. The jut out portion of the board 520 defines the hole in the board 520 having sufficient room for a DPM channel illuminator lens and/or a standard range channel illuminator lens together with a minimal tolerance space between the board 520 and such lenses. In some embodiments, the jut out portion of the board 520 embodies a peninsula shape that tapers inwards towards the lens(es) of the imager(s) of the improved reader 300. In some embodiments, the jut out portion of the board 520 includes a particular position at which the near co-axial polarized light source 534 is to be attached, secured, or otherwise electronically coupled such that it is in alignment with one or more corresponding other components of a near co-axial polarized illuminator, for example the polarizer 512 and/or a polarized illuminator lens 518.

The improved reader 300 further includes a polarized illuminator lens 518. In some embodiments, the polarized illuminator lens 518 embodies one or more optic(s) that project a particular illumination from incoming light. In some embodiments, the polarized illuminator lens 518 projects an illumination of a particular pattern based at least in part on light received from the near co-axial polarized light source 534. In some such embodiments, the polarized illuminator lens 518 defines the dimensions, angle, and/or other characteristics of the near co-axial polarized illumination projected by the improved reader 300. In some embodiments, the polarized illuminator lens 518 is secured in alignment with a component that directs incoming light to the lens, for example directly in alignment with the corresponding near co-axial polarized light source 534. In some such embodiments, the polarized illuminator lens 518 is secured on top of the near co-axial polarized light source 534.

The improved reader 300 further includes an imager lens 528. In some embodiments, the imager lens 528 embodies a narrow field lens that is associated with a corresponding narrow field image sensor and defines a particular narrow field of view that is capturable by the narrow field image sensor. In this regard, in some embodiments the imager lens 528 is aligned with a corresponding narrow field image sensor, such that light progresses through the imager lens 528 to impact the corresponding narrow field image sensor. In some embodiments, for example, the imager lens 528 is aligned with the image sensor 536 as described further herein, where the imager lens 528 and the image sensor 536 form a narrow field imager.

The improved reader 300 further includes the imager lens 526. In some embodiments, the imager lens 526 embodies a wide field lens that is associated with a corresponding wide field image sensor and defines a particular wide field of view that is capturable by a corresponding wide field image sensor, for example the image sensor 538. In this regard, in some embodiments the imager lens 526 is aligned with a corresponding wide field image sensor, such that light progresses through the imager lens 526 to impact the corresponding wide field image sensor. In some embodiments, for example, the imager lens 526 is aligned with the image sensor 538 as described further herein, where the lens imager lens 526 and the image sensor 538 form a wide field imager. In some such embodiments, the wide field of view is wider than the narrow field of view in at least one dimension (or a plurality of dimensions). In some embodiments, the lenses 526 and 528 are constructed differently to define the different field of views based on different focal lengths, or are positioned at different distances from the corresponding image sensors 536 and 538.

The reader 300 further includes a plurality of reflectors, specifically reflector 522A and reflector 522B. In some embodiments, each reflector comprises reflective material(s) and/or lenses that redirect incoming light in a particular direction. For example, in some embodiments, the reflectors 522A and 522B each embody a mirror angled to reflect light in a particular direction. It will be appreciated that in some embodiments, the reflector 522A and/or the reflector 522B is embodied by another optical component that similarly redirects incoming light in a particular direction.

In some embodiments, the one or more reflectors of the improved reader 300 are positioned and aligned to redirect incoming light from an aimer illuminator towards or in accordance with a forward-facing, or "viewing," axis of the improved reader 300. For example, in this regard the reflector 522A in some embodiments first folds light produced by an aimer illuminator towards a central axis of the reader 300. The redirected light is specifically directed towards the reflector 522B. The reflector 522b then redirects the light along the viewing axis of the reader 300 in a near co-axial direction with the field of views capturable via the reader 300. For example, in some embodiments the reflector 522B redirects the light along a viewing axis of the apparatus that is near co-axial with and relatively central (e.g., within defined tolerances) between the narrow and wide fields of view capturable via the reader 300 towards a corresponding aimer lens for projection into such fields of view. It should be appreciated that the reflector 522A and/or reflector 522B may be embodied in a smaller component than a corresponding aimer illuminator that generates the light ultimately projected as the aimer illumination, and thereby allows for the aimer illumination to be projected at a position more central to the fields of view capturable via the reader 300 without requiring the aimer to actually be positioned at such a location, since the size of the aimer may preclude the aimer from being positioned at such a location without offsetting by an unacceptable amount the fields of view capturable by a plurality of imagers of the reader 300. As such, the reflectors enable the aimer illumination to be produced in smaller reader configurations at a defined position within the fields of view without undesirably offsetting the image sensors associated with such fields of view, which would otherwise negatively impact the ability to successfully perform scanning operations utilizing the sensors due to such offset. In this regard, the aimer illuminator may be positioned opposite a center point between the imagers from the near co-axial polarized illuminator, such that both illuminations may be projected in a near co-axial manner.

The reader 300 further includes an aimer lens 524. In some embodiments, the aimer lens 524 embodies one or more optical components that generate an aimer illumination from incoming light. In some embodiments, the aimer lens 524 produces an aimer illumination of a particular pattern from incoming light, for example produced from an aimer light source. In one example embodiment, the aimer lens 524 embodies a collimating lens. For example, in some embodiments, the aimer lens 524 produces a linear illumination pattern from incoming light, and/or collimates the incoming light for producing a particular aimer pattern. In some embodiments, the aimer lens 524 is secured in a position aligned with a component that directs incoming light to the aimer lens 524, for example directly in alignment with an aimer light source, or in some embodiments with one or more reflectors that direct light from an aimer light source to the aimer lens 524.

The reader 300 further includes a component holder 530. In some embodiments, the component holder 530 comprises a physical structure that positions one or more components of the reader 300 in particular positions to align such components with other components located behind the component holder 530. For example, in some embodiments the component holder 530 is molded to position the lenses 526 and 528 in alignment with corresponding image sensors. Additionally or alternatively, in some embodiments, the component holder 530 positions the aimer lens 524 at a defined position to receive light from a corresponding aimer light source. Additionally or alternatively, in some embodiments the component holder 530 positions the reflector 522A and/or reflector 522B at defined positions to enable redirecting of light along a particular viewing axis of the apparatus. In some embodiments, the component holder 530 comprises a single molded portion, or plurality of individual portions affixed or secured together, that defines a cavity to receive each component as described, and/or to secure the component within its respective cavity.

The reader 300 further includes a board 532. The board 532 includes the imaging and illuminator components located furthest back from the optical and illumination components described above. In some embodiments, the board 532 includes or embodies a circuitry board (e.g., a PCB) that includes one or more activatable image sensor(s) utilized to capture image representations of one or more field(s) of view. Additionally or alternatively, in some embodiments, the board 532 includes one or more aimer light source(s) associated with generating an aimer illumination, for example via the aimer lens 524 and/or reflectors 522A and 522B. Additionally or alternatively still, in some embodiments, the board 532 includes processing circuitry utilized for controlling one or more component(s) and/or processing particular data (e.g., captured images of one or more field(s) of view to detect and decode particular captured code(s)). In some embodiments, the board 532 is embodied by a single circuitry board. In other embodiments, the board 532 includes a plurality of interconnected circuitry boards. In some other embodiments, the board 532 includes only a single image sensor associated with a single imager capturing a single field of view. Alternatively or additionally, in some other embodiments, the board 532 includes three or more image sensors, each associated with a different field of view, and which may have the same or different focal ranges.

In some embodiments, the reader 300 further includes an aimer light source electronically coupled to the board 532. The aimer light source is communicatively coupled with the board 532 to enable activation of the light source via the board 532. The aimer light source outputs light utilized to produce a corresponding aimer illumination, for example of a particular pattern. For example, in some embodiments, the aimer light source is aligned with one or more reflectors that redirect the light to one or more aimer lens(es), such as the reflector 522A. Alternatively or additionally, in some embodiments, the aimer light source is aligned with the aimer lens 524 directly. In some embodiments, the aimer light source comprises one or more laser(s) and/or high-concentration LEDs that outputs a concentrated ray of light.

The reader 300 further includes image sensor 536 electronically coupled to the board 532. The image sensor 536 is communicatively coupled with the board 532, for example to enable activation of the image sensor 536 via the board 532. The image sensor 536 captures an image based on light incident to or otherwise impacting or otherwise incident upon the image sensor 536. In some embodiments, the image sensor 536 captures an image representing a particular field of view, for example an image representation of a field of view defined by one or more associated optical component(s). In some embodiments, the image sensor 536 is aligned with the lens 528 to define a particular field of view capturable by said components as an imager.

The reader 300 further includes image sensor 538 electronically coupled to the board 532. The image sensor 538 is communicatively coupled with the board 532, for example to enable activation of the image sensor 538 via the board 532. The image sensor 538 similarly captures an image based on light incident to or otherwise impacting the image sensor 538. In some embodiments, the image sensor 538 captures an image representing a second field of view, for example an image representation of a field of view defined by one or more associated optical component(s). In some embodiments, the image sensor 538 is aligned with the lens 526 to define a particular field of view.

In some embodiments, the image sensor 536 and the image sensor 538, alone or together with lens 526 and/or lens 528, define a plurality of field of views. For example, in some embodiments the image sensor 536 and lens 528 embody a first imager defining a first field of view, and the image sensor 538 and lens 526 embody a second imager defining a second field of view. The field of views may differ in at least one dimension, angle, and/or the like. For example, in some embodiments, the first field of view corresponds to a narrow field of view and the second field of view corresponds to a wide field of view, where the wide field of view is wider than the narrow field of view in at least one direction. In some embodiments, the field of views are defined based at least in part on the optical components associated with each image sensor. Alternatively or additionally, in some embodiments, the field of views are defined based at least in part on the configuration of the image sensors themselves, for example based at least in part on the resolution of each image sensor. In this regard, it will be appreciated that the images generated via the image sensor 536 may differ from the images generated via the image sensor 538.

In some embodiments, the reader 300 further includes a processor electronically coupled to the board 532. The processor in some embodiments is electronically coupled to enable transmission of data to the processor from other components of the reader 300 and/or from the processor to other components of the reader 300. For example, in some embodiments the processor is communicatively coupled with one or more illumination light source(s) for example the aimer light source, one or more illuminator light source(s) of the other board(s) 520 and/or 506, and/or the like. Additionally or alternatively, in some embodiments the processor is electronically coupled with the image sensors 536 and/or 538, for example to enable activation of the image sensor 536 and/or 538, and/or to receive image data captured by the image sensor 536 and/or 538.

Additionally or alternatively, in some embodiments, the processor executes computer-coded instructions embodying one or more computer-implemented process(es) and/or software application(s). The computer-implemented process(es) and/or software application(s) in some embodiments control one or more aspect(s) of the reader 300. For example, in some embodiments the processor executes one or more software application(s) that determine when to activate one or more image sensor(s) of the reader 300, when to activate one or more light source(s) of the reader 300, which light source(s) of the reader 300 to activate, and/or the like. For example, in some embodiments, upon activation the processor executes software application(s) that perform(s) one or more predefined algorithm(s), machine learning model(s), and/or artificial intelligence model(s) that determine when and/or which components of the reader 300 should be activated.

In some embodiments, the various board(s) of the reader 300 are communicable with one another. For example, in some embodiments, the board 532 is communicatively coupled with the board 520 and/or board 506. In such embodiments, signal(s) and/or data may be sent from a particular board to one or more other board(s). For example, in some embodiments activation signal(s) is/are transmitted from the board 532 to the board 520 and/or to the board 506, such as to activate illuminator(s) thereon. In some embodiments, the various board(s) of the reader 300 are separate from one another, and may be activated via the same mechanism(s) (e.g., a trigger of the reader 300, not depicted).

In some embodiments, one or more components of the reader 300 are connected to form assemblies of the reader 300. Similarly, in some embodiments, the assemblies of the reader 300 are connected to one another to fit all components within a portion of the chassis. For example, in some embodiments the ring lens 504 and board 506 form a ring illuminator assembly, with each component physically or chemically secured to the component behind it. Additionally or alternatively, in some embodiments, the protective window 514, analyzer 510, and polarizer 512 embody a protective window assembly, with each component physically or chemically secured to the component behind it. Additionally or alternatively, in some embodiments, the diffuser 508, protective window assembly, and back light reflector 516 form a diffuser assembly, with each component physically or chemically secured to the component behind it. Additionally or alternatively still, in some embodiments, the aimer lens 524, lens 526, lens 528. reflector 522A, reflector 522B form a lens assembly, with each lens and reflector physically or chemically secured to the component holder 530. Additionally or alternatively still, in some embodiments, the board 532, image sensor 536, image sensor 538, and/or processor form an imager board. The various assemblies, such as the ring illuminator assembly, diffuser assembly, lens assembly, and imager board are each physically or chemically affixed.

In some embodiments, the various depicted components of the reader 300 are affixed or otherwise connected to the chassis of the reader 300. For example, in some embodiments, one or more securing components (e.g., screws, rivets, and/or the like) are utilized to secure the assemblies to the chassis. Additionally or alternatively, in some embodiments, the chassis includes one or more portions that extend outward to enable snapping into particular portions of one or more components of the reader 300.

It will be appreciated that the various components of the reader 300 may be aligned and/or secured in any of a myriad of manners. In some embodiments, the board 520 and the board 532 are each secured to an apparatus chassis, for example chassis portions 502A and/or 502B. In this regard, such components secured to the chassis of the apparatus may be further secured (e.g., directly or indirectly) to each other component of the reader 300. For example, various lenses (e.g., associated with one or more image sensors and/or an aimer), aimer reflector(s), and/or the like in some embodiments are secured to the component holder 530, which may be secured to the board 532 as described herein. In some embodiments, the ring illuminator assembly is secured to the front of the diffuser illuminator assembly (e.g., along the perimeter of the opening of the diffuser 508), forming a front illuminator assembly. In this regard, securing a single component of the front illuminator assembly, for example the board 520, within the apparatus maintains the position and relative alignment of each component of the front illuminator assembly. In this regard, the various components of the reader 300 may be secured in place and in alignment without requiring each component to be individually secured via the chassis.

FIG. 6 illustrates an exploded view of subassemblies of a near co-axial polarized illuminator apparatus and projected polarized illumination in accordance with at least an example embodiment of the present disclosure. Specifically, FIG. 6 illustrates an exploded view of a protective window assembly 608, a near co-axial polarized illuminator board assembly 610, and an imager-aimer board assembly 612. In some embodiments, the protective window assembly 608, the near co-axial polarized illuminator board assembly 610, and the imager-aimer board assembly 612 align with one another within an apparatus chassis, for example of the reader 300, to enable operation of the various components thereof.

As illustrated, the protective window assembly 608 includes a protective window, an analyzer, and a polarizer. The near co-axial polarized illuminator board assembly 610 includes a near co-axial illuminator 602 positioned on a jut out portion 604 of a middle board. The aimer-illuminator board 612 includes at least the image sensor(s) and aimer light source aligned with a component holder assembly that forms the illuminator(s) and/or imager(s) thereof.

The components of the various subassemblies are positioned in a manner that arranges the components for operation. For example, in some embodiments the protective window assembly 608 aligns a polarizer with the near co-axial illuminator 602 to form a near co-axial polarized illuminator. Additionally or alternatively, in some embodiments, the protective window assembly 608 aligns an analyzer with a particular imager of the imager-aimer board 612. In some embodiments, the analyzer is aligned with and positioned in front of the DPM channel imager, such that the analyzer filters out light from reaching the DPM channel imager. The imager-aimer board assembly 612 positions and aligns the imagers to position through the hole in the board of the near co-axial polarized illuminator board assembly 610. In this regard, the distance and angle offset between the aimer illumination from the near co-axial aimer illuminator and the polarized illumination from the near co-axial polarized illuminator is minimized.

The reduced offset between the imagers, aimer, and polarized illuminator result in near co-axial illuminations projected via the various subassemblies. As illustrated, the near co-axial polarized illuminator formed from the various subassemblies projects the polarized illumination 606. Similarly, the near co-axial aimer illuminator formed from the various subassemblies projects the aimer illumination 614. Such illuminations may both be projected in near co-axial alignment with a viewing axis defining the fields of view capturable via the apparatus. In this regard, the particular configuration and design of the subassemblies enables the projection of such illuminations in near co-axial alignment.

FIG. 7 illustrates an illuminator board subassembly in accordance with at least an example embodiment of the present disclosure. Specifically, FIG. 7 depicts an illuminator board subassembly 700. In some embodiments, the illuminator board subassembly 700 embodies the near co-axial polarized illuminator board assembly 610 as depicted and described herein.

The illuminator board subassembly 700 includes a plurality of diffuser light sources, specifically diffuser light sources 708A, 708B, 708C, and 708D (collectively "diffuser light sources 708"). In some embodiments, each of the diffuser light sources 708 produces light directed towards one more components of a diffuser illuminator assembly. For example, in some embodiments, each diffuser light source 708 shines light into a diffusion back light reflector, where the diffusion back light reflector redirects such light into a diffuser for uniform projection of a diffuse illumination.

The illuminator board subassembly 700 additionally includes a protective window 706. The protective window 706 prevents object(s), particle(s), fluid(s), and/or the like from impacting component(s) located behind the protective window 706. For example, in some embodiments, the protective window 706 is positioned in front of at least a first image sensor and at least a second image sensor, for example embodying a DPM channel image sensor and a standard range channel image sensor, to protect such image sensor(s) from impact. In some embodiments, the protective window 706 includes one or more defined portion(s) and/or component(s) for securing the protective window 706 to a particular position. In some embodiments for example, the protective window 706 includes one or more securing cavities, such as the securing cavities 708A-708C, that secure the protective window 706 in a particular position. In some embodiments, the securing cavities 708A-708C receives a securing mechanism that extends from the circuitry board of the illuminator board subassembly 700 to lock the protective window 706 in a particular position relative to the board. Alternatively or additionally, in some embodiments, the securing cavities 708A-708C receive a securing mechanism that extends from another board, such as an aimer-illuminator board positioned behind the illuminator board subassembly 700. In yet some other embodiments, the securing cavities 708A-708C are soldered, chemically secured, or otherwise bonded to a particular place.

The illuminator board subassembly 700 further includes a near co-axial polarized illuminator 702. As described herein, in some embodiments, the near co-axial polarized illuminator 702 is positioned on the right side of the protective window 706, such that all subcomponents of the near co-axial polarized illuminator 702 are aligned and unobstructed by other components. For example, in some embodiments, the near co-axial polarized illuminator 702 includes at least one near co-axial polarized illuminator light source, at least one near co-axial illuminator lens, and at least one polarizer. Such components are positioned on a jut out of the circuitry board of the illuminator board subassembly 700 to allow the near co-axial polarized illuminator to be positioned more closely to a center point of the DPM channel image sensor and standard range channel image sensor. It will be appreciated that the jut out and/or the corresponding position of the near co-axial polarized illuminator 702 may be positioned on the other side of the protective window 706 in other embodiments without deviating from the scope and spirit of the disclosure, for example having its position swapped with a near co-axial aimer light source.

The illuminator board subassembly 700 further includes an analyzer 704. As described herein, the analyzer 704 may be positioned in front of one or more image(s). For example, as illustrated, the analyzer 704 in some embodiments is positioned in front of a standard range channel imager, for example to filter out light of particular orientation(s) from reaching the corresponding imager. In some other embodiments, the analyzer 704 is positioned and/or sized to be in front of both imager(s) and/or all imager(s) of the apparatus. Alternatively or additionally, in some embodiments, the analyzer 704 is positioned only in front of another imager, for example towards the bottom portion of the protective window 706 to be positioned in front of a corresponding DPM channel imager.

Example Processes of the Disclosure

Having described example systems, apparatuses, reader(s), and subassemblies of the disclosure, example processes in accordance with the present disclosure will now be described. It will be appreciated that each of the flowcharts depicts an example computer-implemented process that is performable by one or more of the apparatuses, systems, devices, and/or computer program products described herein, for example utilizing one or more of the specially configured components thereof. For example, in some embodiments, the apparatus 200 embodying the improved reader 102 and/or improved reader 300 performs the process(es) described herein utilizing one or more memory/memories and/or processor(s) as described herein.

In some embodiments, the process(es) described herein provide for improved operation of the improved reader(s) described herein. For example, the process(es) may be utilized to improve the likelihood that an initiated scanning operation is performed successfully (e.g., by activating one or more particular component(s) that maximize the likelihood that a captured image includes a detectable and decodable representation of a code). In this regard, in some embodiments the process(es) describe operations for controlling a reader, such as the reader 102, in a particular manner. In some other embodiments, the reader 102 is controlled utilizing one or more other process(es), for example that utilize a pre-determined or defined algorithm for activating component(s) thereof based on a selected operational mode, previously stored historical data, and/or the like.

The blocks depicted indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 8 illustrates an example process for use of an improved near co-axial polarized illuminator apparatus in accordance with at least an example embodiment of the present disclosure. Specifically, FIG. 8 depicts example operations of an example process 800. In some embodiments, the process 800 is embodied by computer program code stored on a non-transitory computer-readable storage medium of a computer program product configured for execution to perform the process as depicted and described. Alternatively or additionally, in some embodiments, the process 800 is performed by one or more specially configured computing devices, such as the improved reader 102 and/or 300 embodied by the apparatus 200 alone or in communication with one or more other component(s), device(s), system(s), and/or the like. In this regard, the apparatus 200 is specially configured by computer-coded instructions (e.g., computer program instructions) stored thereon, for example in the memory 204 and/or another component as depicted and/or described, for performing the operations as depicted and described in FIG. 8.

In operation 802, the apparatus 200 includes means, such as the imager(s) 210, illuminator(s) 212, control circuitry 214, communications circuitry 208, input/output circuitry 206, processor 202, and/or the like, or a combination thereof, that activates a polarized illuminator adjacent to at least each of a DPM channel imager and a standard range channel imager. In some embodiments, the polarized illuminator embodies a near co-axial polarized illuminator. In some embodiments, the apparatus 200 generates and transmits one or more control signal(s) to a polarized light source of the polarized illuminator to cause activation of the light source and generation of light by said light source. Such activation may take place as part of a scanning process or other operation for capture and/or processing of image representation(s) of one or more fields of view illuminated by the polarized illuminator.

In operation 804, the apparatus 200 includes means, such as the imager(s) 210, illuminator(s) 212, control circuitry 214, communications circuitry 208, input/output circuitry 206, processor 202, and/or the like, or a combination thereof, that exposes at least a selected imager of the apparatus 200. For example, in some embodiments, the apparatus 200 exposes one of the DPM channel imager or the standard range channel imager that are adjacent to the polarized illuminator. During exposure the selected imager may generate image data based on light incident on the image sensor of the selected imager. In some embodiments, the apparatus 200 specifically exposes the DPM channel imager that is associated with an analyzer corresponding to the polarizer of the near co-axial polarized illuminator. In this regard, the minimized offset between the DPM channel imager and the near co-axial polarized illuminator reduces the negative effects of the angle differential between the imager and the illumination from affecting the exposure of the DPM channel imager.

In operation 806, the apparatus 200 includes means, such as the imager(s) 210, illuminator(s) 212, control circuitry 214, communications circuitry 208, input/output circuitry 206, processor 202, and/or the like, or a combination thereof, that outputs a captured image from the selected imager. In some embodiments, the captured image is output from an image sensor of the selected imager. Specifically, the captured image may represent the electrical signals captured by the selected imager during the exposure period. In some embodiments, the apparatus specifically outputs the captured image from the DPM channel imager exposed during the step 804.

In optional operation 808, the apparatus 200 includes means, such as the imager(s) 210, illuminator(s) 212, control circuitry 214, communications circuitry 208, input/output circuitry 206, processor 202, and/or the like, or a combination thereof, that processes the captured image utilizing at least one image processing algorithm. In some embodiments, the apparatus 200 processes the captured image utilizing a machine-readable symbology detection algorithm and/or machine-readable symbology decoding algorithm. In this regard, the apparatus 200 may process the captured image to determine whether any machine-readable symbology(s) is/are detected in the captured image, and/or decode data from any detected machine-readable symbology(s). Such data may be output, displayed via a user interface, transmitted to an external device or system, and/or utilized in one or more subsequent process(es).

CONCLUSION

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising:
   a DPM channel image sensor;
   a standard range channel image sensor;
   a near co-axial polarizer light source positioned adjacent to the DPM channel image sensor and adjacent to the standard range channel image sensor;
   a near co-axial polarizer aligned with the near co-axial polarizer light source; and
   an analyzer aligned with the DPM channel image sensor and/or the standard range channel image sensor.

2. The apparatus according to claim 1, the apparatus further comprising:
   a near co-axial polarizer lens aligned with the near co-axial polarizer light source.

3. The apparatus according to claim 1, the apparatus further comprising:
   a protective window aligned in front of the DPM channel image sensor, the standard range channel image sensor, and the near co-axial polarizer light source.

4. The apparatus according to claim 1, the apparatus further comprising a protective window, wherein the polarizer and the analyzer are secured to the protective window.

5. The apparatus according to claim 1, wherein the analyzer is aligned with the DPM channel image sensor.

6. The apparatus according to claim 1, the apparatus further comprising an illumination board comprising a jut out, a first hole, and a second hole, wherein the jut out is adjacent to a center point between the first hole that receives the DPM channel image sensor and the second hole that receives the standard range channel image sensor, wherein the near co-axial polarizer light source is electronically coupled on the jut out.

7. The apparatus according to claim 1, the apparatus further comprising at least one additional illuminator.

8. The apparatus according to claim 1, the apparatus further comprising a ring illuminator.

9. The apparatus according to claim 1, the apparatus further comprising a diffusion illuminator.

10. The apparatus according to claim 1, the apparatus further comprising a near co-axial aimer light source positioned adjacent to the DPM channel image sensor and adjacent to the standard range channel image sensor, wherein the near co-axial aimer light source is positioned across a center point between the DPM channel image sensor and the standard range channel image sensor.

11. The apparatus according to claim 1, the apparatus further comprising a chassis that houses the DPM channel image sensor, the standard range channel image sensor, the near co-axial polarizer light source, the near co-axial polarizer, and the analyzer.

12. The apparatus according to claim 1, the apparatus further comprising a processor that controls activation of the DPM channel image sensor, the standard range channel image sensor, and/or the near co-axial polarizer light source.

13. The apparatus according to claim 1, the apparatus further comprising a processor communicatively coupled with the DPM channel image sensor and/or the standard range channel image sensor, wherein the processor receives a captured image from the standard range channel image sensor and/or the standard range channel image sensor, and wherein the processor processes the captured image via at least one image processing algorithm.

14. The apparatus according to claim 1, wherein the DPM channel image sensor and the standard range channel image sensor are vertically aligned, and wherein the near co-axial polarizer light source is positioned to a side adjacent to a center point between the DPM channel image sensor and the standard range channel image sensor.

15. The apparatus according to claim 1, the apparatus further comprising:
a first board; and
a second board,
wherein the DPM channel image source and the standard range channel image source are electronically coupled to the first board, and wherein the near co-axial polarizer light source is electronically coupled to the second board.

16. The apparatus according to claim 15, the apparatus further comprising:
a third board; and
at least one ring illuminator light source,
the at least one right illuminator light source electronically coupled to the third board.

17. The apparatus according to claim 1, the apparatus further comprising:
a DPM channel lens aligned with the DPM channel image sensor; and
a standard range channel lens aligned with the standard range channel image sensor.

18. The apparatus according to claim 1, the apparatus further comprising:
an aimer light source; and
a plurality of aimer folding optics, wherein the plurality of aimer folding optics are aligned to receive an aimer light generated by the aimer light source and redirect the aimer light in near co-axial alignment with the DPM channel image sensor and the standard range channel image sensor.

19. The apparatus according to claim 1, the apparatus further comprising:
a ring illuminator assembly comprising a ring lens, a ring illuminator board, and at least one ring illuminator light source electronically coupled to the ring illuminator board, wherein the ring lens is aligned in front of the at least one ring illuminator light source;
a diffusion illuminator assembly comprising a diffusion illuminator and a diffusion back light reflector;
a protector assembly comprising a protector window, the near co-axial polarizer, and the analyzer;
at least one back light illumination board, wherein the near co-axial polarizer light is electronically coupled to the at least one back light illumination board;
a near co-axial polarizer lens aligned with the near co-axial polarizer light source;
a lens assembly comprising an aimer lens, a DPM channel imager lens, and a standard range channel imager lens;
an aimer illuminator aligned with the aimer lens;
at least one aimer folding optics; and
at least one imager board comprising the DPM channel image sensor and the standard range channel image sensor.

20. A computer-implemented method comprising:
activating, via a reader, a polarized illuminator, the polarized illuminator positioned adjacent to at least each of a DPM channel imager and a standard range channel imager;
exposing, via the reader, the DPM channel imager adjacent to the polarized illuminator to light projected through an analyzer aligned with the DPM channel imager; and
outputting, via the reader, a captured image from the DPM channel imager based at least in part on the exposure of the DPM channel imager.

* * * * *